US009308704B2

(12) United States Patent
Thomas et al.

(10) Patent No.: US 9,308,704 B2
(45) Date of Patent: Apr. 12, 2016

(54) ELASTOMERIC BLADDER SYSTEM

(71) Applicant: The Boeing Company, Chicago, IL (US)

(72) Inventors: Charles William Thomas, Seattle, WA (US); David Allen Hahs, Seattle, WA (US)

(73) Assignee: THE BOEING COMPANY, Chicago, IL (US)

(*) Notice: Subject to any disclaimer, the term of this patent is extended or adjusted under 35 U.S.C. 154(b) by 217 days.

(21) Appl. No.: 13/769,491

(22) Filed: Feb. 18, 2013

(65) Prior Publication Data

US 2014/0231022 A1  Aug. 21, 2014

(51) Int. Cl.
| B65C 3/26 | (2006.01) |
| B29C 65/00 | (2006.01) |
| B32B 37/00 | (2006.01) |
| B29C 53/00 | (2006.01) |
| A01J 21/00 | (2006.01) |
| A01J 25/12 | (2006.01) |
| A21C 3/00 | (2006.01) |
| A21C 11/00 | (2006.01) |
| A23G 1/20 | (2006.01) |
| A23G 3/02 | (2006.01) |

(Continued)

(52) U.S. Cl.
CPC . *B32B 1/08* (2013.01); *B23P 19/04* (2013.01); *B29C 33/505* (2013.01); *B29C 33/76* (2013.01); *B29C 70/446* (2013.01); *B29C 65/02* (2013.01); *B29C 66/5221* (2013.01); *B29C 66/71* (2013.01); *Y10T 29/49826* (2015.01)

(58) Field of Classification Search
CPC .. B29C 70/44; B29C 70/446; B29C 43/3642; B29C 43/12; B29C 66/1122; B29C 66/4312; B29C 66/432; B29C 66/4322; B29C 66/5221; B29C 53/42; B29C 65/48; B29C 2791/007; B29D 30/0654; B28B 7/32; B28B 21/88; B28B 21/20; E04G 15/066; B32B 1/08
USPC ............ 156/60, 83, 145, 146, 147, 156, 160, 156/165, 184, 190, 191, 196, 198, 217, 218, 156/229, 289, 293, 294, 303.1, 307.1, 156/307.3, 307.4, 307.5, 349, 381, 382; 425/417, 175, 176, 387.1; 264/219, 264/314; 249/175, 178, 180
See application file for complete search history.

(56) References Cited

U.S. PATENT DOCUMENTS 3,862,736 A * 1/1975 Herro .............................. 249/65
4,897,139 A * 1/1990 Wood .............................. 156/188

(Continued)

FOREIGN PATENT DOCUMENTS

| DE | 102006031334 A1 | 1/2008 |
| EP | 0396302 A1 | 11/1990 |
| EP | 0846205 B1 | 8/1996 |
| JP | 54-148070 A * | 11/1979 .............. B29C 27/16 |

OTHER PUBLICATIONS

PCT Search Report for application PCT/US2014/011485 filed on Jan. 14, 2014 dated Aug. 18, 2014, 5 pages.

*Primary Examiner* — Philip Tucker
*Assistant Examiner* — Brian R Slawski
(74) *Attorney, Agent, or Firm* — Yee & Associates, P.C.

(57) ABSTRACT

A method for and apparatus for forming a bladder system. A bladder with an open end is formed. The open end of the bladder is placed into an interior of a fitting. The open end of the bladder is connected to the interior of the fitting.

15 Claims, 18 Drawing Sheets

(51) Int. Cl.
    *A23P 1/00*     (2006.01)
    *B28B 11/08*     (2006.01)
    *B32B 1/08*     (2006.01)
    *B23P 19/04*     (2006.01)
    *B29C 33/50*     (2006.01)
    *B29C 33/76*     (2006.01)
    *B29C 70/44*     (2006.01)
    *B29C 65/02*     (2006.01)

(56) References Cited

U.S. PATENT DOCUMENTS

| | | | |
|---|---|---|---|
| 5,071,506 A * | 12/1991 | Nelson et al. | 156/441 |
| 5,194,268 A | 3/1993 | Bradley et al. | |
| 2010/0186899 A1 * | 7/2010 | Jackson et al. | 156/382 |
| 2011/0277918 A1 | 11/2011 | Lee et al. | |

* cited by examiner

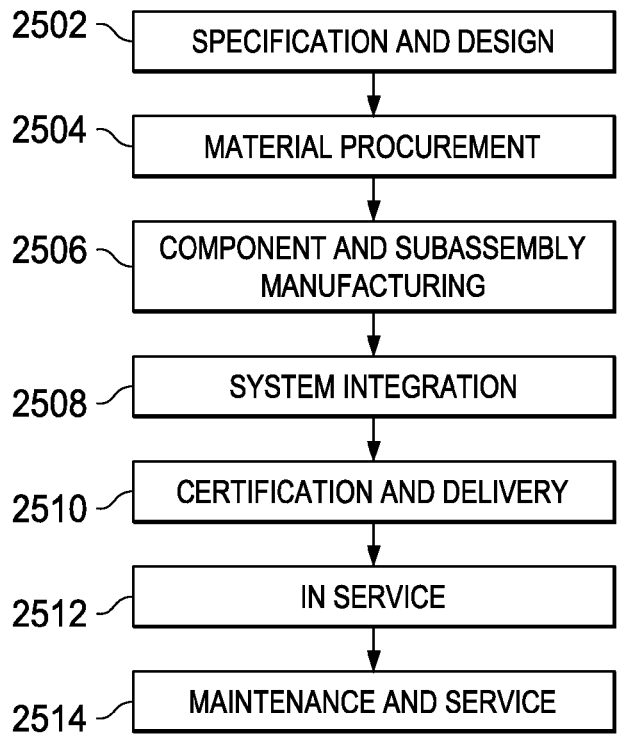
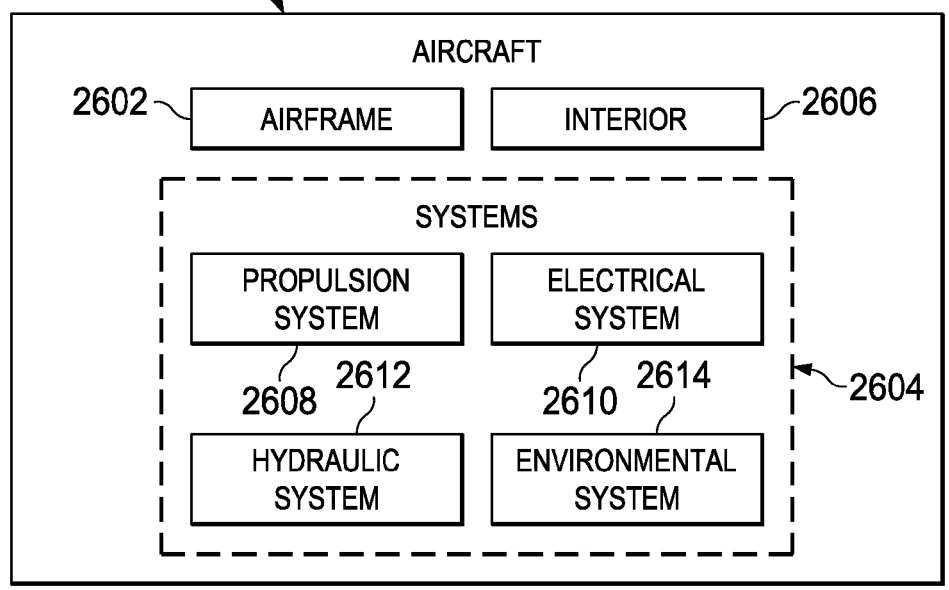

ELASTOMERIC BLADDER SYSTEM

BACKGROUND INFORMATION

1. Field

The present disclosure relates generally to manufacturing composite structures and, in particular, to devices used for manufacturing composite structures. Still more particularly, the present disclosure relates to a method and apparatus for fabricating an elastomeric bladder for manufacturing composite structures.

2. Background

Aircraft are being designed and manufactured with greater and greater percentages of composite materials. Composite materials are used in aircraft to decrease the weight of the aircraft. This decreased weight may improve performance features such as, for example, without limitation, payload capacity and fuel efficiency. Further, composite materials may provide longer service life for various components in an aircraft.

Composite materials may be tough, light-weight materials created by combining two or more functional components. For example, without limitation, a composite material may include reinforcing fibers bound in a polymer resin matrix. The fibers may be unidirectional or may take the form of a woven cloth or fabric. The fibers and resins may be arranged and cured to form a composite structure.

Using composite materials to create aerospace composite structures may allow for portions of an aircraft to be manufactured in larger pieces or sections. For example, without limitation, a fuselage in an aircraft may be created in cylindrical sections. Other examples may include, without limitation, wing sections joined to form a wing or stabilizer sections joined to form a stabilizer.

In manufacturing composite structures, layers of composite material may be laid up on a tool. The layers of composite material may be comprised of fibers in sheets. These layers may take the form of, for example, without limitation, fabrics, tape, tows, and/or other suitable configurations for the sheets. In some cases, resin may be infused or pre-impregnated into the sheets. These types of sheets are commonly referred to as prepreg.

The different layers of prepreg may be laid up in different orientations and different numbers of layers may be used depending on the desired thickness of the composite structure being manufactured. These layers may be laid up by hand and/or by using automated lamination equipment such as a tape laminating machine or a fiber placement system.

In laying up the layers of prepreg, composite structures in the form of panels may be defined. For example, without limitation, the layers of prepreg may be laid up to form a skin panel. The skin panel may have a thickness that is selected to reduce the weight of the aircraft. When the skin panel is light and thin, the skin panel may be more flexible than desired.

Stiffening structures may be included with the skin panel to reduce flexing, vibrations, and/or other undesirable movement. A stringer is an example of a stiffening structure that may be formed with the skin panel to reduce the flexing, vibrations, and/or other undesirable movement in the skin panel during use. Additional layers of prepreg also may be laid up to form stringers for the skin panel.

In forming a stringer, layers of prepreg are laid up in a desired shape for the stringer. A stringer may have a channel. The channel may be defined in the stringer using a mandrel. The mandrel may take the form of an elastomeric bladder.

The layers of prepreg may be laid up on a tool in the shape of a stringer, with the elastomeric bladder defining the channel of the stringer within the layers of prepreg, in an uncured form. After the different layers of prepreg have been laid up on the tool, the layers of prepreg may be consolidated and cured upon exposure to temperature and pressure, thus forming the final composite structure in a cured form. The elastomeric bladder may be inflated to support the surfaces of the stringer during the fabrication process.

In inflating the elastomeric bladder, the elastomeric bladder may be sealed. The seal may be made with respect to the tool, a vacuum bag used to apply pressure to the layers of prepreg, or some combination thereof. Currently, the elastomeric bladder may be sealed using a sealant tape that seals the elastomeric bladder to the vacuum bag. This technique, however, may not be as reliable as desired and may be labor-intensive. Further, inconsistencies may develop in the elastomeric bladder that may cause the elastomeric bladder to perform in an undesired manner.

One solution may involve having a metallic fitting at an end of a pre-cured elastomeric bladder. For example, without limitation, the elastomeric bladder may be first fabricated and cured. The metal fitting may then be bonded to an interior surface within a cavity of the cured elastomeric bladder. When the metal fitting is bonded to the interior surface of the bladder, the expansion of the bladder may pull the bladder away from the metal fitting.

This separation may occur during the curing of a stringer using the bladder, which may result in an undesired shape for the stringer. The separation also may result in a leak between the bladder and the end of the fitting that reduces the pressure applied to the stringer on a skin panel. Consequently, the skin panel may need to be reworked, discarded, or some combination thereof. Therefore, it would be desirable to have a method and apparatus that takes into account at least some of the issues discussed above, as well as other possible issues.

SUMMARY

In one illustrative embodiment, a method for forming a bladder system is provided. A bladder with an open end is formed. The open end of the bladder is placed into an interior of a fitting. The open end of the bladder is connected to the interior of the fitting.

In another illustrative embodiment, a method for forming a bladder system is provided. An elastomeric bladder having an open end is formed such that a portion of the elastomeric bladder at the open end of the elastomeric bladder is a tapered portion having a cross-section with an outer cross-sectional shape that decreases in size towards the open end of the elastomeric bladder. The tapered portion of the elastomeric bladder is placed into a flared portion of an interior of a fitting through an open end of the fitting such that an outer surface of the tapered portion substantially conforms to a surface of the flared portion. A portion of the fitting at the open end of the fitting has a cross-section with an inner cross-sectional shape defined by the surface of the flared portion. The inner cross-sectional shape increases towards the open end of the fitting. The open end of the elastomeric bladder is connected to the interior of the fitting by performing at least one of curing the elastomeric bladder with the tapered portion located within the interior of the fitting, curing a number of layers of uncured material with the tapered portion of the elastomeric bladder located within the interior of the fitting in which the tapered portion of the elastomeric bladder is bonded to the interior of the fitting, and bonding the tapered portion of the elastomeric bladder to the interior of the fitting with an adhesive.

In yet another illustrative embodiment, an apparatus comprises a bladder with an open end and a fitting. The open end of the bladder is connected to the interior of the fitting.

In still another illustrative embodiment, a bladder system for forming a composite structure with a channel comprises an elastomeric bladder having an open end and a fitting having an interior with a flared portion at an open end of the fitting. A tapered portion of the elastomeric bladder at the open end of the bladder has a cross-section with an outer cross-sectional shape that decreases in size towards the open end of the bladder. A portion of the fitting at the open end of the fitting has a cross-section with an inner cross-sectional shape formed by a surface of the flared portion that increases in size towards the open end of the fitting. The open end of the elastomeric bladder is connected to the interior of the fitting by being bonded to the surface of the flared portion of the interior of the fitting. The fitting is comprised of a material selected from one of metal, polycarbonate, plastic, aluminum, steel, and a composite material.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 25 is an illustration of an aircraft manufacturing and service method in accordance with an illustrative embodiment; and FIG. 26 is an illustration of an aircraft in which an illustrative embodiment may be implemented.

DETAILED DESCRIPTION

The illustrative embodiments recognize and take into account one or more considerations. For example, without limitation, the illustrative embodiments recognize and take into account that it may be desirable to have a bladder and fitting that may be associated with each other in a manner that reduces the possibility of these two components separating when used for the curing layers of composite material. Further, the illustrative embodiments recognize and take into account that it may be desirable to reduce and/or prevent leaks that may occur during the curing of the layers of composite material using the bladder and fitting.

Thus, the illustrative embodiments provide a method and apparatus for fabricating a bladder system. A bladder with an open end is formed. The open end of the bladder is placed into an interior of a fitting. The open end of the bladder is connected to the interior of the fitting.

Figure 1:
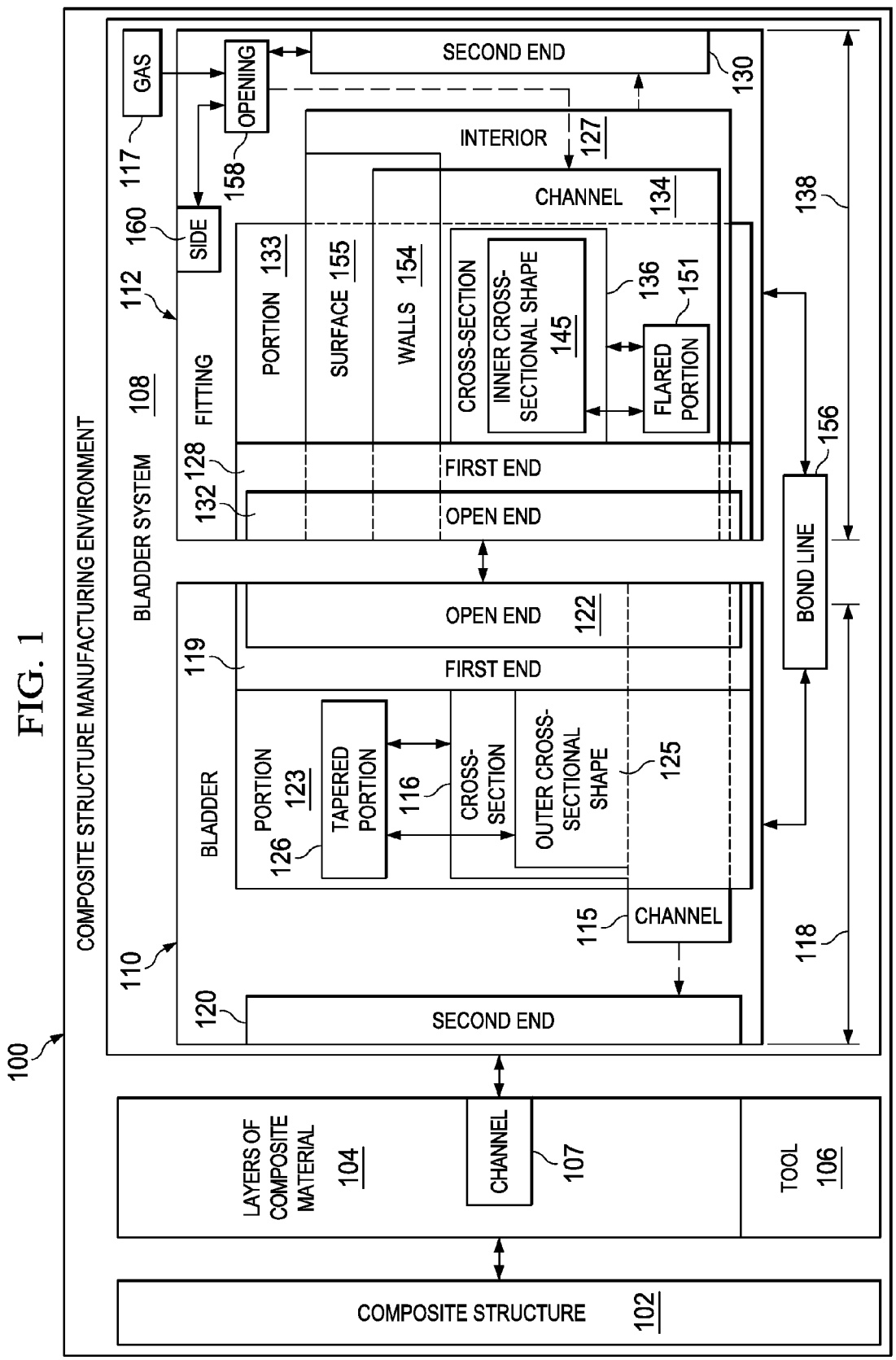
FIG. 1 is an illustration of a block diagram of a composite structure manufacturing environment in accordance with an illustrative embodiment.

With reference now to the figures and, in particular, with reference to FIG. 1, an illustration of a block diagram of a composite structure manufacturing environment is depicted in accordance with an illustrative embodiment. In this illustrative example, composite structure manufacturing environment 100 is an example of an environment in which composite structure 102 may be manufactured.

In this depicted example, composite structure 102 may be, for example, without limitation, a stringer, a spar, a unitized box structure, an aerodynamic blade, a duct, a tubular structure, and other suitable types of structures. Composite structure 102 may be manufactured by laying up layers of composite material 104 for composite structure 102 on tool 106. In this particular example, layers of composite material 104 may be layers of fiber infused with a resin. Layers of composite material 104 may take the form of a prepreg in this illustrative example.

As depicted, channel 107 may be formed in layers of composite material 104 for composite structure 102. In this illustrative example, bladder system 108 may be used to define channel 107 in layers of composite material 104. For example, without limitation, bladder system 108 may be pressurized within channel 107 in layers of composite material 104.

With bladder system 108 defining channel 107, layers of composite material 104 may be cured to form composite structure 102 in a cured form. The curing of layers of composite material 104 may occur under at least one of heat and pressure.

As used herein, the phrase "at least one of," when used with a list of items, means different combinations of one or more of the listed items may be used and only one of each item in the list may be needed. For example, without limitation, "at least one of item A, item B, and item C" may include, without limitation, item A or item A and item B. This example also may include item A, item B, and item C or item B and item C. The item may be a particular object, thing, or category. In other words, "at least one of" may mean any combination of items and any number of items may be used from the list, but not all of the items in the list may be required.

In this illustrative example, bladder system 108 may have increased reliability during the curing of layers of composite material 104 as compared to currently used bladder systems. As depicted, bladder system 108 may include bladder 110 and fitting 112.

In this depicted example, bladder 110 has elongate shape 114. In this illustrative example, bladder 110 may be an elastomeric bladder. Additionally, bladder 110 may have channel 115. Channel 115 may have various shapes. For example, without limitation, channel 115 may be have a cylindrical shape, an elliptic cylindrical shape, a hyperbolic cylindrical shape, a prism shape, a trapezoidal prism shape, a spherical shape, or some other type of shape depending on the particular implementation.

These shapes for cross-section 116 may be shapes that are present when bladder 110 is pressurized using gas 117. Gas 117 may be introduced into channel 115 to pressure bladder 110. Gas 117 may be, for example, without limitation, at least one of air, nitrogen, helium, and other suitable types of gas.

As depicted, bladder 110 may have first end 119 and second end 120. In this particular example, first end 119 may be open end 122 which allows access into channel 115 in bladder 110. In one illustrative example, channel 115 may extend along the entire length 118 of bladder 110 from first end 119 of bladder 110 to second end 120. Depending on the implementation, channel 115 may or may not extend all the way to second end 120. For example, without limitation, second end 120 may be a closed end or may be an open end that is covered or capped. In some cases, channel 115 may only extend along a portion of length 118 of bladder 110.

Portion 123 of bladder 110 at first end 119 of bladder 110 may be configured for association with fitting 112. In particular, portion 123 may be configured to fit within interior 127 of fitting 112. Interior 127 of fitting 112 may or may not extend across the entire length 138 of fitting 112, depending on the implementation.

As depicted, cross-section 116 through portion 123 of bladder 110 may have outer cross-sectional shape 125. Outer cross-sectional shape 125 of portion 123 of bladder 110 may decrease in size towards open end 122 of bladder 110 and increase in size away from open end 122. In other words, portion 123 may taper towards open end 122. With this type of shape, portion 123 may be referred to as tapered portion 126.

As depicted, fitting 112 may have first end 128 and second end 130. In this illustrative example, first end 128 also may be open end 132. Open end 132 may allow access to interior 127 of fitting 112. In one illustrative example, interior 127 of fitting 112 may have surface 155. Surface 155 may also be referred to as the inner surface of fitting 112. In one illustrative example, interior 127 of fitting 112 may take the form of channel 134 and surface 155 may form the walls 154 of channel 134.

The tapering of tapered portion 126 of bladder 110 may be selected such that tapered portion 126 fits channel 134 through open end 132 of fitting 112. In particular, cross-section 136 through portion 133 of fitting 112 may have inner cross-sectional shape 145 defined by walls 154 of channel 134. Inner cross-sectional shape 145 may increase in size towards open end 132 of fitting 112 and decrease in size away from open end 132 of fitting 112. In other words, inner cross-sectional shape 145 may flare out towards open end 132. In this manner, the portion of channel 134 within portion 133 of fitting 112 may be referred to as flared portion 151.

Tapered portion 126 may be placed within channel 134 of fitting 112 such that tapered portion 126 of bladder 110 substantially conforms to flared portion 151 of channel 134. More specifically, the outer surface (not shown) of tapered portion 126 may substantially conform to walls 154 of channel 134 when tapered portion 126 is placed into channel 134. In some illustrative examples, tapered portion 126 may be in contact with walls 154 of channel 134 along the entire length 138 of fitting 112. However, in other illustrative examples, tapered portion 126 may only extend along a portion of length 138.

As used herein, the placement of tapered portion 126 within channel 134 may mean that some or all of tapered portion 126 is located within channel 134 of fitting 112. When tapered portion 126 of bladder 110 is located within interior 127 of fitting 112, channel 115 through bladder 110 may be considered connected to or substantially continuous with channel 134 through fitting 112.

In this illustrative example, fitting 112 may be comprised of a number of different materials. For example, without limitation, fitting 112 may be comprised of a material selected from one of metal, polycarbonate, plastic, aluminum, steel, a composite material, and other suitable materials. The selection of materials for fitting 112 may be based on the ability of the materials to be used to manufacture composite structures. For example, without limitation, the materials selected for fitting 112 may be able to withstand the environment in which composite structures are manufactured.

As depicted, tapered portion 126 of bladder 110 may be placed into flared portion 151 of channel 134. In particular, tapered portion 126 and flared portion 151 may be configured such that bladder 110 may be bonded to fitting 112 in a desired manner. For example, without limitation, tapered portion 123 of bladder 110 may be associated with flared portion 151 of channel 134 in fitting 112 by being bonded to walls 154 of channel 134.

In one illustrative embodiment, walls 154 may be prepared for bonding with bladder 110 prior to tapered portion 126 being inserted into channel 134. For example, without limitation, walls 154 may be coated with at least one of a primer or some other type of material that may facilitate or enhance bonding of bladder 110. The bonding may be performed by curing bladder 110 while tapered portion 126 of bladder 110 is located within flared portion 151 of channel 134.

With this type of configuration, bond line 156 between bladder 110 and fitting 112 may be located within interior 127 of fitting 112. Bond line 156 may be a location where stress may occur when bladder 110 is pressurized. With bond line 156 located within fitting 112, bond line 156 may be less likely to peel, fail, or develop an undesired inconsistency.

Additionally, fitting 112 also may have opening 158. Opening 158 may provide access to interior 127 of fitting 112. In particular, opening 158 may allow gas 117 to be introduced into in channel 115 of bladder 110. For example, without limitation, opening 158 may be located at second end 130 of fitting 112. Opening 158 may open into channel 134 through fitting 112. When gas 117 is introduced into channel 134, gas 117 may flow through both channel 134 in fitting 112 and into channel 115 in bladder 110 through open end 122 of bladder 110.

Of course, in other illustrative examples, opening 158 may not be located at second end 130 of fitting 112. Rather, opening 158 may be located at side 160 of fitting 112 or some other suitable location on fitting 112.

In this manner, bladder 110 may be pressurized using gas 117. With tapered portion 126 of bladder 110 being located within interior 127 of fitting 112 and connected to fitting 112, separation between bladder 110 and fitting 112 may be reduced when bladder 110 is pressurized using gas 117.

Figure 2:
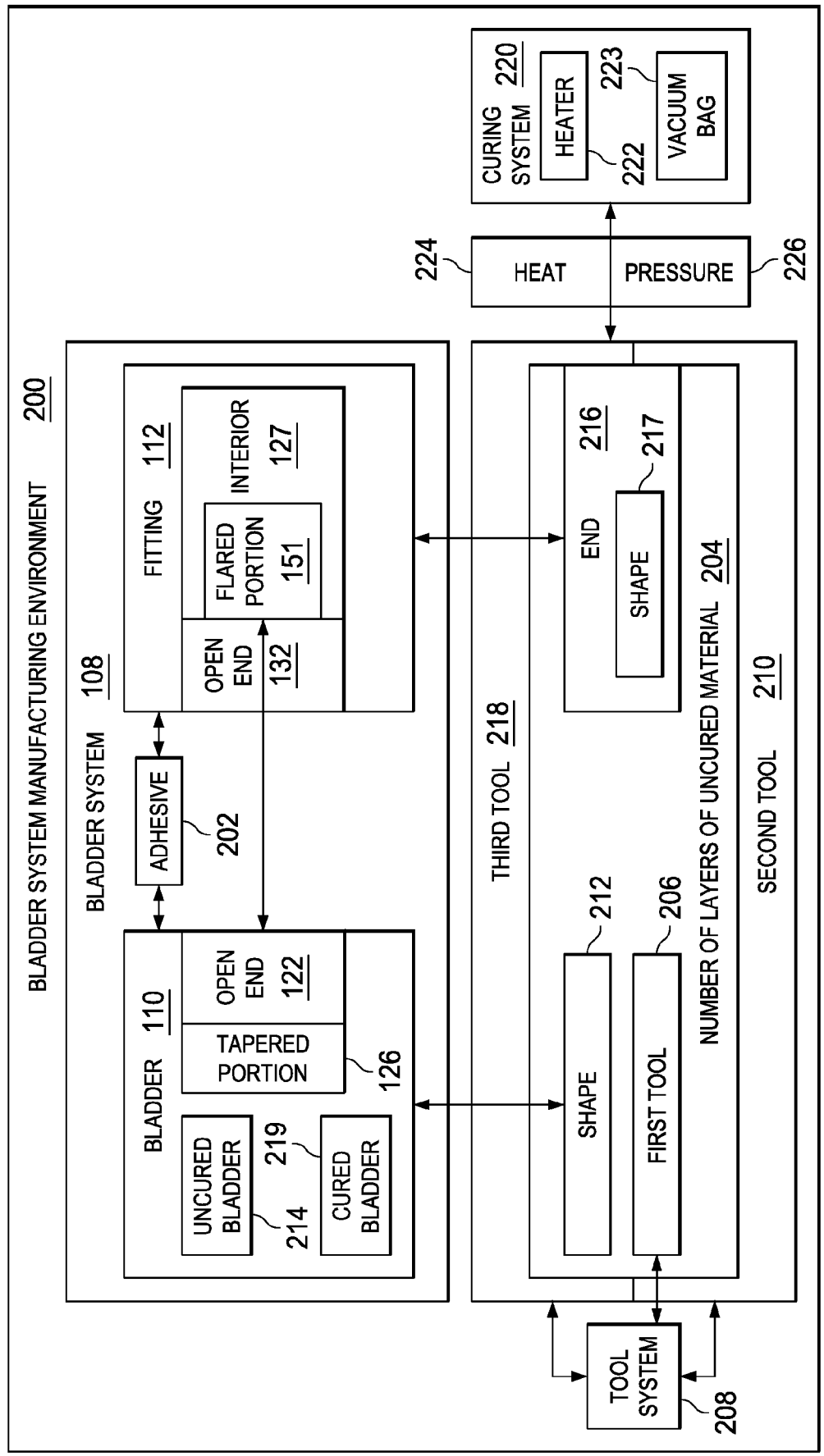
FIG. 2 is an illustration of a block diagram of a bladder system manufacturing environment in accordance with an illustrative embodiment.

Turning now to FIG. 2, an illustration of a block diagram of a bladder system manufacturing environment is depicted in accordance with an illustrative embodiment. In this illustrative example, bladder system 108 may be manufactured in a number of different ways within bladder system manufacturing environment 200.

Some of the components in bladder system 108 are shown in bladder system manufacturing environment 200 for purposes of illustrating the manufacturing of bladder system 108. Other components not discussed with respect to the manufacturing of bladder system 108 are not depicted in this figure.

As depicted, bladder 110 may be formed with open end 122. Further, bladder 110 may be formed such that bladder 110 has tapered portion 126 at open end 122. Tapered portion 126 of bladder 110 may be placed into interior 127 of fitting 112 through open end 132 of fitting 112. Tapered portion 126 may then be connected to interior 127 of fitting 112. In some cases, tapered portion 126 may be connected to interior 127 by connecting open end 122 of bladder 110 to interior 127

As depicted, tapered portion 126 may be connected to interior 127 of fitting 112 by bonding tapered portion 126 to interior 127 of fitting 112. In this illustrative example, tapered portion 126 may be connected to interior 127 of fitting 112 by curing bladder 110 within fitting 112. More specifically, tapered portion 126 of bladder 110 may be cured while tapered portion 126 of bladder 110 is located within interior 127 of fitting 112. In this manner, bladder 110 may be considered co-cured with fitting 112 in some illustrative examples.

The curing of bladder 110 with tapered portion 126 located within fitting 112 may result in tapered portion 126 of bladder 110 being bonded to interior 127 of fitting 112. In particular, tapered portion 126 of bladder 110 may be bonded to flared portion 151 of interior 127 of fitting 112 after bladder 110 is cured with fitting 112.

In some illustrative examples, adhesive 202 also may be used to bond tapered portion 126 of bladder 110 to interior 127 of fitting 112. Adhesive 202 may be comprised of, for example, without limitation, at least one of silicone caulk, elastomer caulk, epoxy, or some other type of adhesive.

In this illustrative example, bladder 110 may be uncured bladder 214 and may be formed from number of layers of uncured material 204. Number of layers of uncured material 204 may be comprised of various types of materials. For example, without limitation, number of layers of uncured material 204 may be comprised of at least one of a layer of rubber, a layer of fiberglass coated rubber, a layer of fiberglass-reinforced rubber, a layer of a carbon fiber-reinforced polymer, a layer of fiber-reinforced silicon, a layer of woven fabric, a layer of latex, or some other type of layer. In one illustrative example, number of layers of uncured material 204 may comprise a first layer of rubber, a second layer of fiberglass coated rubber, and a third layer of rubber.

In these depicted examples, number of layers of uncured material 204 may be folded up around first tool 206 in tool system 208. Next, end 216 of number of layers of uncured material 204 may be placed into interior 127 of fitting 112 through open end 132 of fitting 112. In this particular example, end 216 of number of layers of uncured material 204 may have shape 217 that corresponds to tapered portion 126 of open end 122 of bladder 110.

Thereafter, number of layers of uncured material 204 wrapped around first tool 206 may be placed between second tool 210 and third tool 218 in tool system 208. Second tool 210 and third tool 218 may be secured to each other to hold number of layers of uncured material 204 wrapped around first tool 206.

Next, number of layers of uncured material 204 in tool system 208 with end 216 inserted into interior 127 of fitting 112 may be cured using curing system 220 to form bladder system 108 with bladder 110 being cured bladder 219. In this particular example, curing system 220 includes at least one of heater 222 and vacuum bag 223.

Heater 222 is configured to generate heat 224 to cure number of layers of uncured material 204. Heater 222 may be, for example, without limitation, at least one of an oven, an autoclave, a halogen light source, and other suitable sources for heat 224.

Vacuum bag 223 may be placed over number of layers of uncured material 204 and fitting 112 in tool system 208. Vacuum bag 223 may be used to apply pressure 226 on number of layers of uncured material 204. In these illustrative examples, pressure 226 may be applied at substantially the same time as heat 224.

Heat 224, pressure 226, or both heat 224 and pressure 226 may be applied until number of layers of uncured material 204 is cured. Further, heat 224, pressure to 226, or both heat 224 and pressure 226 may be applied until end 216 of number of layers of uncured material 204 forms a bond with interior 127 of fitting 112.

The illustrations of composite structure manufacturing environment 100 in FIG. 1 and bladder system manufacturing environment 200 in FIG. 2 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

For example, without limitation, one or more additional bladder systems may be used in addition to bladder system 108 to form one or more additional channels in addition to channel 107 in composite structure 102 in FIG. 1. In some cases, second end 130 of fitting 112 may also be an open end configured to receive a second bladder.

In other illustrative examples, bladder 110 may be comprised of a material configured to deform such that portion 123 of bladder may be squeezed into interior 127 of fitting 112 through open end 132 of fitting 112. With this type of bladder 110, portion 123 of bladder 110 may not be tapered. For example, without limitation, force may applied to cause portion 123 of bladder 110 to enter interior 127 of fitting 112 through open end 132 of fitting 112. The outer surface (not shown) of tapered portion 126 may substantially conform to surface 155 of interior 127 of fitting 112 in FIG. 1.

As another illustrative example, tapered portion 126 of bladder 110 may be bonded to interior 127 of fitting 112 after bladder 110 has already been cured to form cured bladder 219. In other words, tapered portion 126 may be bonded to interior 127 of fitting 112 after number of layers of uncured material 204 is cured in shape 212 for bladder 110. This bonding may be performed using adhesive 202.

With reference now to FIGS. 3-13, illustrations of a bladder system and the various components that make up the bladder system are depicted in accordance with an illustrative embodiment. In FIGS. 3-13, bladder system 300 may be an example of one physical implementation of bladder system 108 shown in block form in FIG. 1 and FIG. 2.

Figure 3:
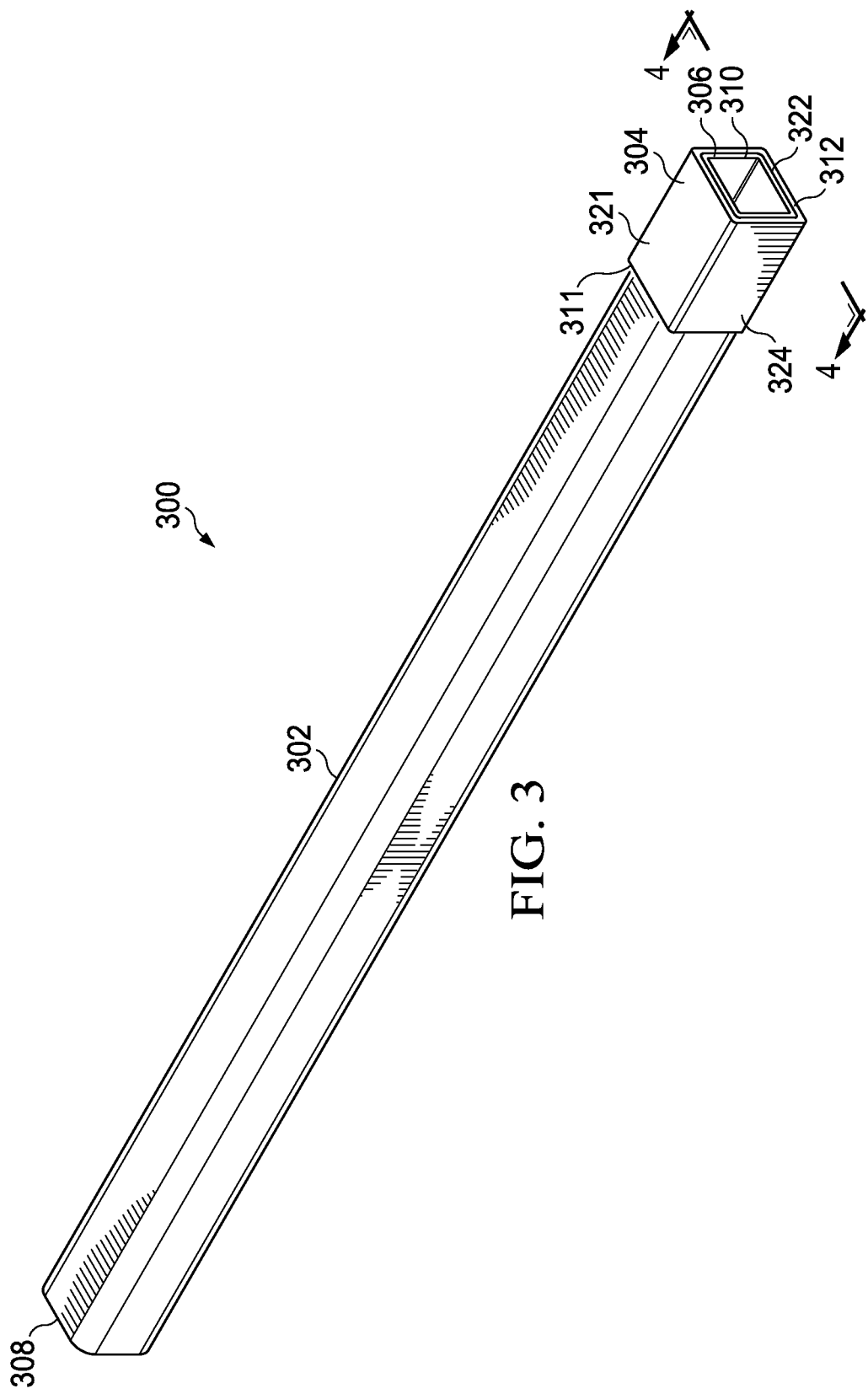
FIG. 3 is an illustration of a bladder system in accordance with an illustrative embodiment.

With reference now to FIG. 3, an illustration of an isometric view of a bladder system is depicted in accordance with an illustrative embodiment. In this figure, an isometric view of bladder system 300 is shown. As depicted, bladder system 300 includes bladder 302 and fitting 304. Bladder 302 may be an example of one physical implementation for bladder 110 shown in block form in FIG. 1 and FIG. 2. Further, fitting 304 may be an example of one physical implementation for fitting 112 shown in block form in FIG. 1 and FIG. 2.

In this figure, bladder 302 may have first end 306 and second end 308. As depicted, first end 306 may be open end 310 and may be located within the interior (not seen in this view) of fitting 304.

In this illustrative example, fitting 304 may have first end 311 and second end 312. Opening 322 at second end 312 may be an example of one manner in which opening 158 in fitting 112 as shown in FIG. 1 may be implemented. Of course, in another example, opening 322 may be located on side 321, side 324, or some other location on fitting 304.

Figure 4:
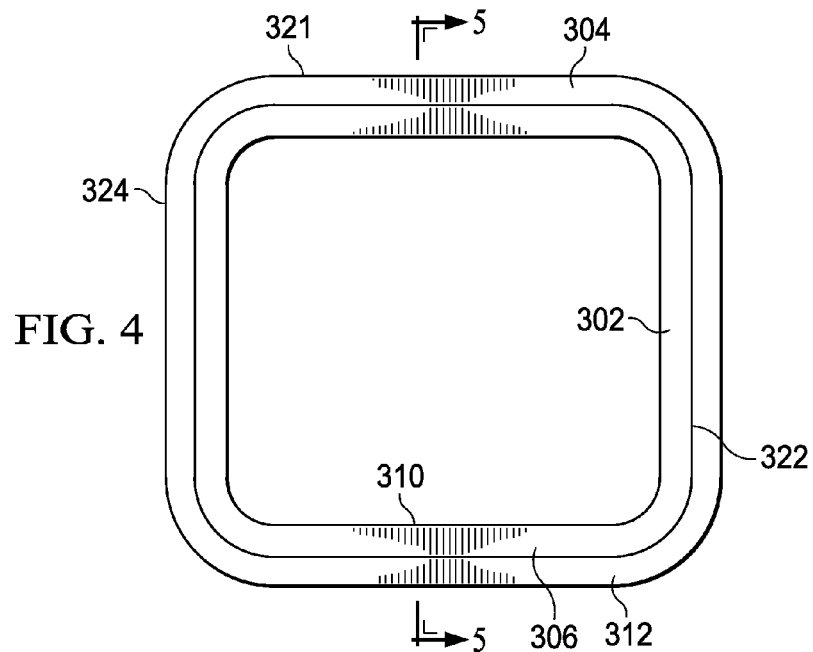
FIG. 4 is an illustration of an end view of a bladder system in accordance with an illustrative embodiment.

With reference now to FIG. 4, an illustration of an end view of bladder system 300 from FIG. 3 is depicted in accordance with an illustrative embodiment. In this illustrative example, an end view of bladder system 300 from FIG. 3 is seen with respect to lines 4-4. Second end 312 of fitting 304 and first end 306 of bladder 302 may be seen in this view.

Figure 5:
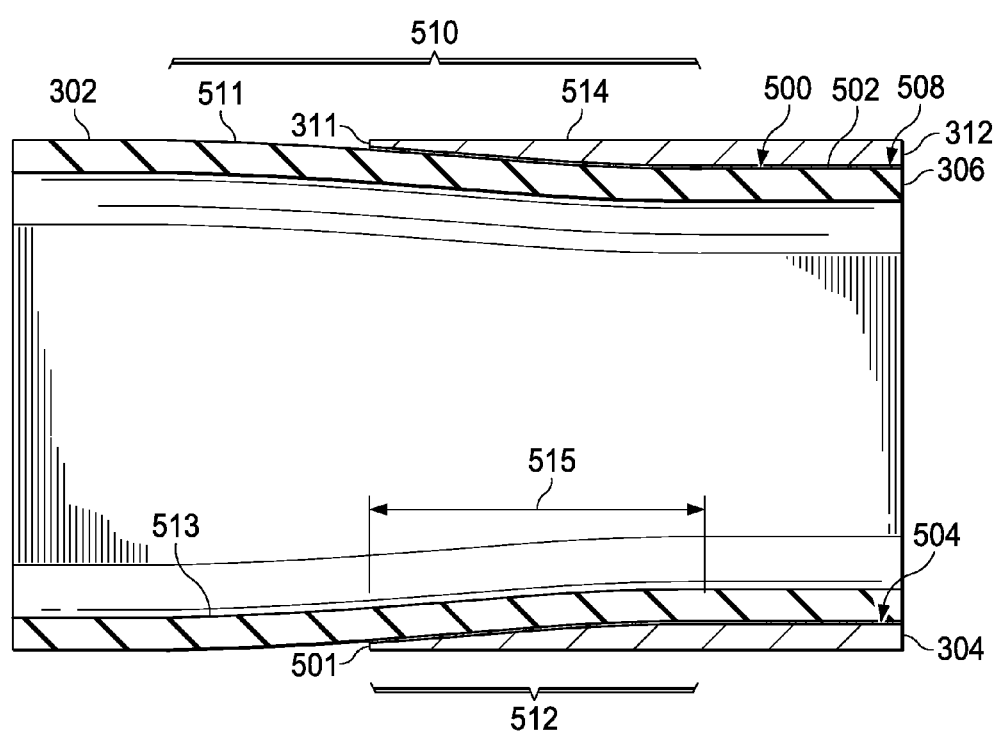
FIG. 5 is a cross-sectional view of a bladder system in accordance with an illustrative embodiment.

Turning next to FIG. 5, a cross-sectional view of bladder system 300 from FIG. 3 is depicted in accordance with an illustrative embodiment. In this figure, a cross-sectional view of bladder system 300 is seen taken along lines 5-5 in FIG. 4. As depicted, bladder 302 has been inserted into fitting 304 through first end 311 of fitting 304. First end 311 is open end 501 in this example.

In this view, bond 500 may be formed between bladder 302 and surface 502 of interior 508 of fitting 304. In this illustrative example, interior 508 takes the form of channel 504. Surface 502 may form the walls of channel 504. In particular, bond 500 may be formed between tapered portion 510 of bladder 302 and flared portion 515 of interior 508 of fitting 304. Flared portion 515 of interior 508 of fitting 304 may be located within portion 512 of fitting 304. Tapered portion 510 of bladder 302 is configured to substantially conform to flared portion 515 of interior 508 of fitting 304.

Tapered portion 510 decreases in size towards open end 310 of bladder 302. More specifically, the outer cross-sectional shape (not shown) defined by outer surface 511 of tapered portion 510 decreases in size towards open end 310 of bladder 302.

As depicted, with this type of tapering, the thickness of bladder 302 between outer surface 511 and inner surface 513 of bladder 302 does not change within tapered portion 510. In other words, the inner cross-sectional shape (not shown) defined by inner surface 513 of bladder 302 decreases in size by the same amount and at the same rate as outer surface 511 towards open end 310 of bladder 302. However, in other illustrative examples, inner surface 513 may not change and only outer surface 511 of tapered portion 510 may be varied.

Flared portion 515 of interior 508 increases in size towards open end 501 of fitting 304. More specifically, the inner cross-sectional shape (not shown) of a cross-section through portion 512 of fitting 304, which is defined by surface 502 of flared portion 515 of interior 508, increases in size towards open end 501 of fitting 304.

As depicted, with this type of flaring, only surface 502 of interior 508 is varied, while outer surface 514 of fitting 304 does not change. In other words, the thickness of fitting 304 between outer surface 514 of fitting 304 and surface 502 of interior 508 of fitting 304 decreases towards open end 501 of fitting 304. Of course, in other illustrative examples, outer surface 514 of fitting 304 may change such that this thickness remains substantially constant.

As depicted, bond 500 between tapered portion 510 of bladder 302 and flared portion 515 of interior 508 of fitting 304 may not require that all of tapered portion 510 be bonded to flared portion 515. Only a portion of outer surface 511 of tapered portion 510 of bladder 302 may need to be bonded to surface 502 of flared portion 515 of interior 508 of fitting 304 to form bond 500. Bond 500 may be formed during the curing of bladder 302 in this illustrative example.

Figure 6:
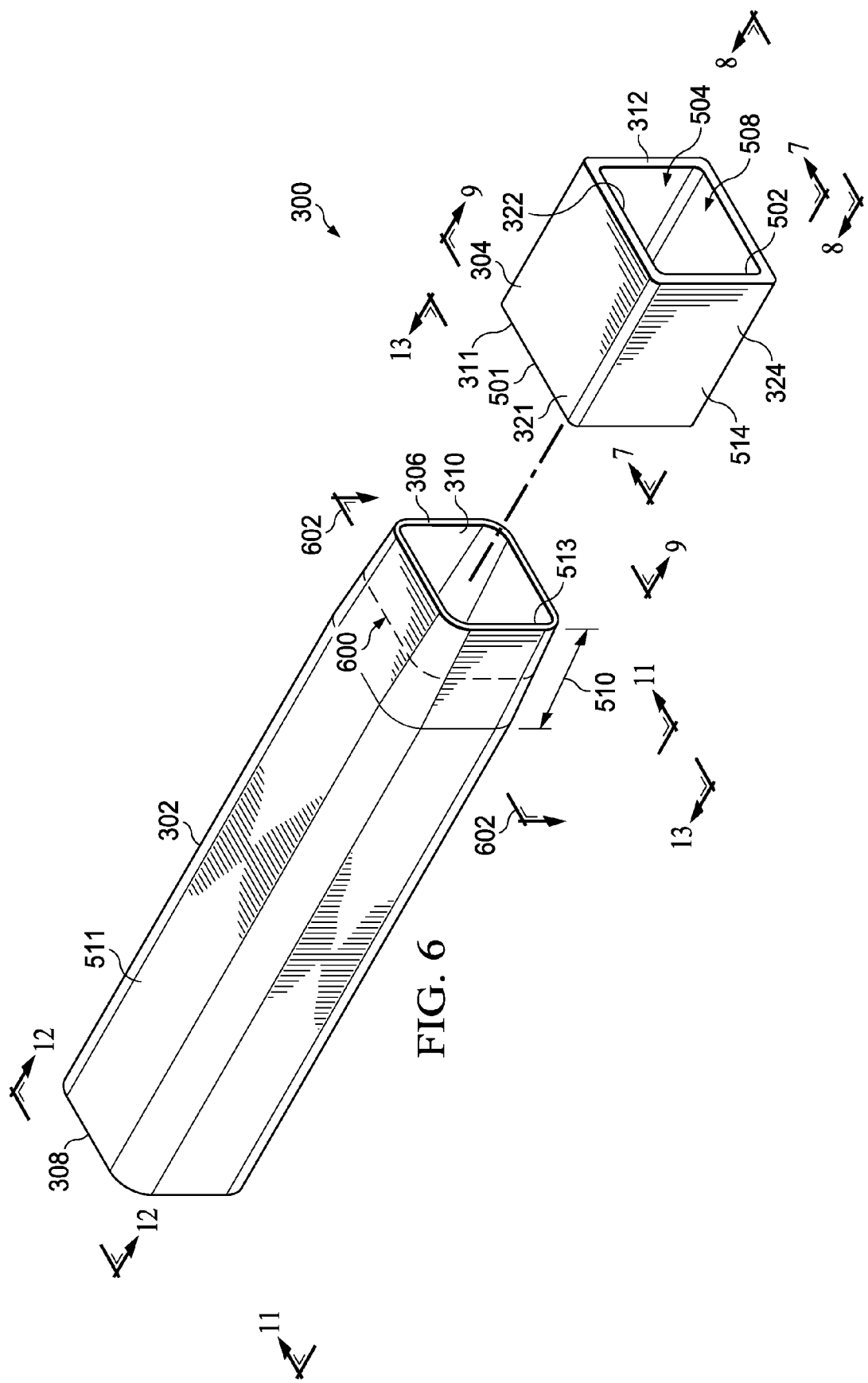
FIG. 6 is an illustration of an exploded view of a bladder system in accordance with an illustrative embodiment.

With reference next to FIG. 6, an illustration of an exploded isometric view of bladder system 300 from FIGS. 3-5 is depicted in accordance with an illustrative embodiment. In this exploded view, tapered portion 510 of bladder 302 can be more clearly seen. As depicted, outer cross-sectional shape 600 of cross-section 602 through tapered portion 510 of bladder 302 may decrease in size towards open end 310 of bladder 302.

Figure 7:
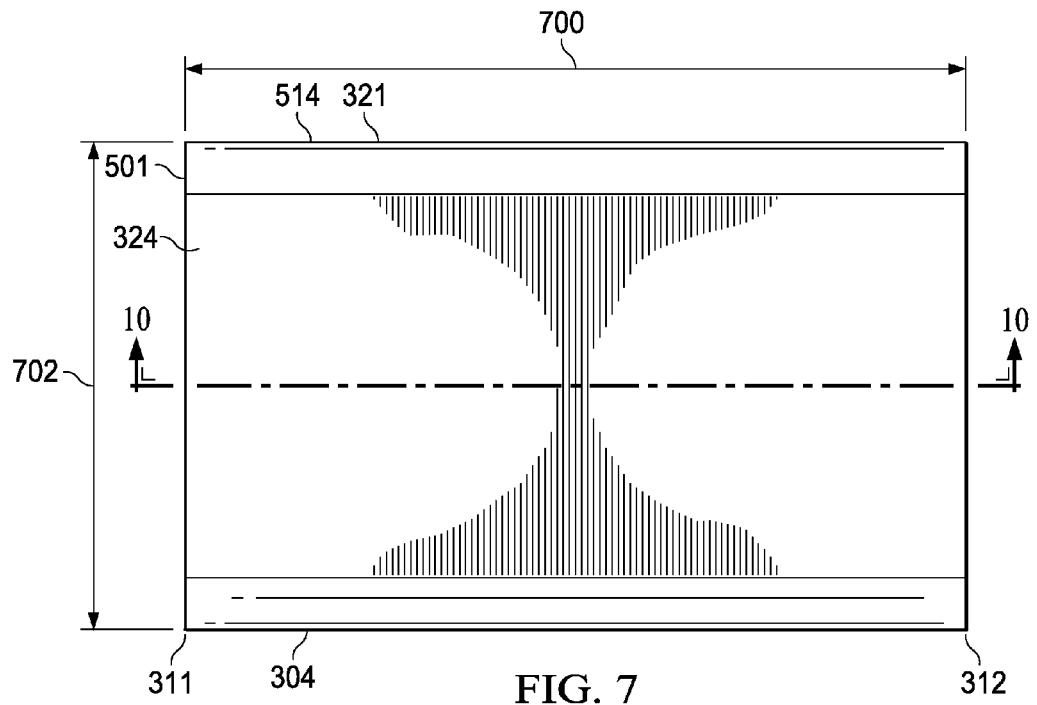
FIG. 7 is an illustration of a side view of a fitting in accordance with an illustrative embodiment.

With reference next to FIG. 7, an illustration of a side view of side 324 of fitting 304 from FIG. 6 is depicted in accordance with an illustrative embodiment. In FIG. 7, a view of side 324 of fitting 304 is seen with respect to lines 7-7 in FIG. 7. As depicted, fitting 304 has length 700 and height 702. Length 700 may be about 4.00 inches and height 702 may be about 2.48 inches. Of course, in other illustrative examples, length 700 and height 702 may vary.

Figure 8:
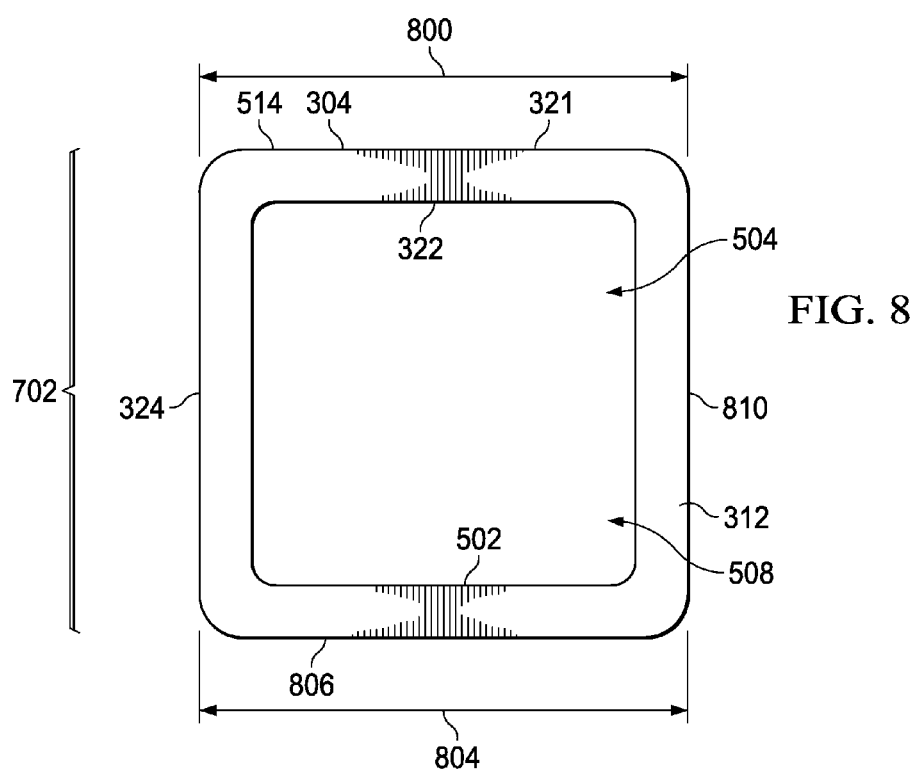
FIG. 8 is an illustration of an end view of a fitting in accordance with an illustrative embodiment.

In FIG. 8, an illustration of an end view of second end 312 of fitting 304 from FIG. 6 is depicted in accordance with an illustrative embodiment. In this illustrative example, an end view of second end 312 of fitting 304 is seen with respect to lines 8-8 in FIG. 8. As depicted, second end 312 has width 800. Width 800 may be the width of side 321 of fitting 304, while width 804 may be the width of side 806 of fitting 304. As depicted, both width 800 and width 804 may be about 2.632 inches. Of course, in other illustrative examples, width 800 and width 804 may have different values.

In this view, height 702 may have the same value on both side 324 and side 810 of fitting 304. Further, channel 504 may be clearly seen within interior 508 of fitting 304.

Figure 9:
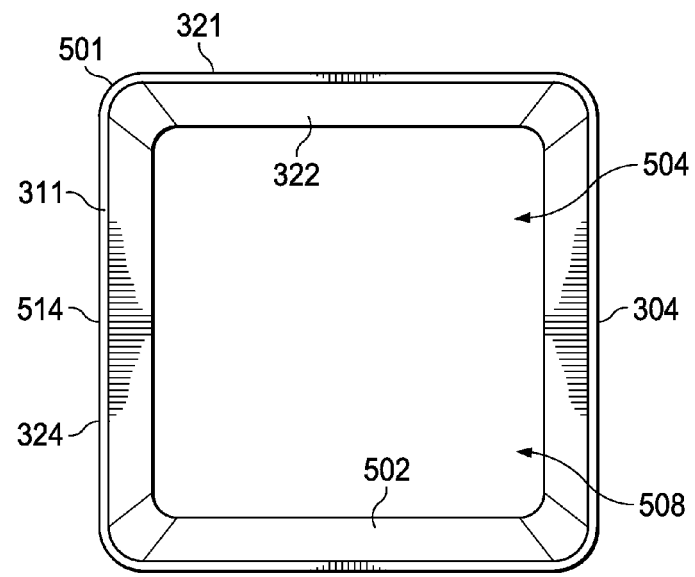
FIG. 9 is an illustration of an end view of a fitting in accordance with an illustrative embodiment.

Turning next to FIG. 9, an illustration of an end view of first end 311 of fitting 304 from FIG. 6 is depicted in accordance with an illustrative embodiment. In this figure, a view from first end 311 of fitting 304 is shown.

Figure 10:
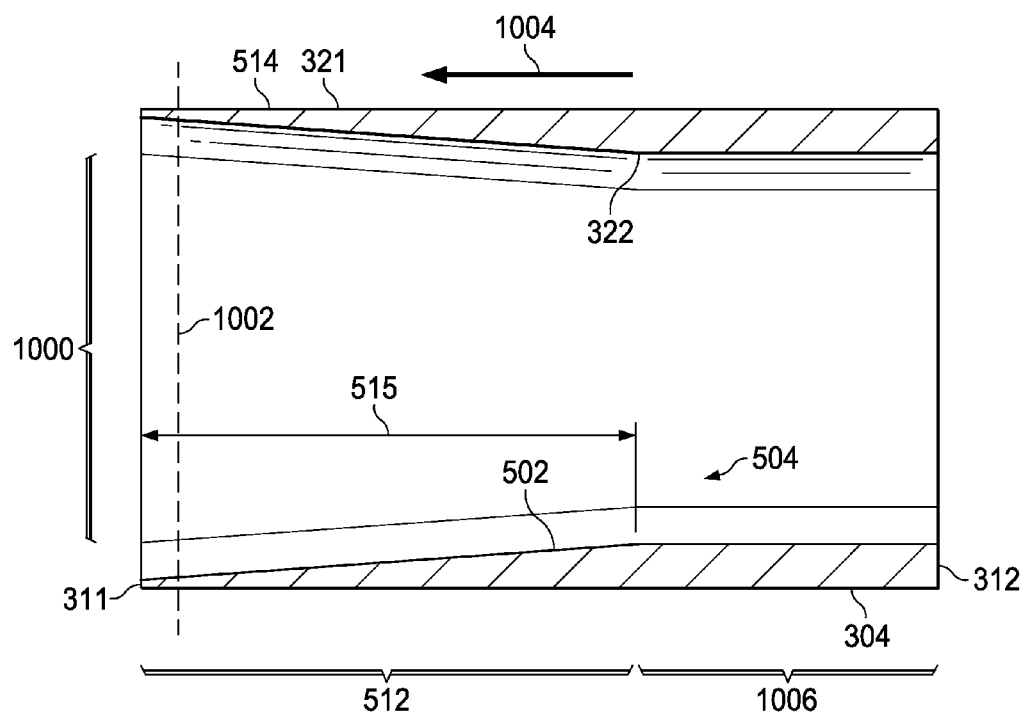
FIG. 10 is an illustration of a cross-sectional view of a fitting in accordance with an illustrative embodiment.

Turning next to FIG. 10, an illustration of a cross-sectional view of fitting 304 from FIG. 7 is depicted in accordance with an illustrative embodiment. As depicted, a cross-sectional view of fitting 304 is shown taken along lines 10-10 in FIG. 7.

In this cross-sectional view of fitting 304, channel 504 flares out towards open end 501 in flared portion 515 of interior 508 of fitting 304. In other words, cross-section 1002 of fitting 304 may have inner cross-sectional shape 1000, defined by surface 502 of interior 508, that increases in size in the direction of arrow 1004. Flared portion 515 of interior 508 of fitting 304 may be configured to receive tapered portion 510 of bladder 302. As depicted, portion 1006 of fitting 304 may be substantially constant such that the size of channel 504 remains substantially the same within portion 1006.

Figure 11:
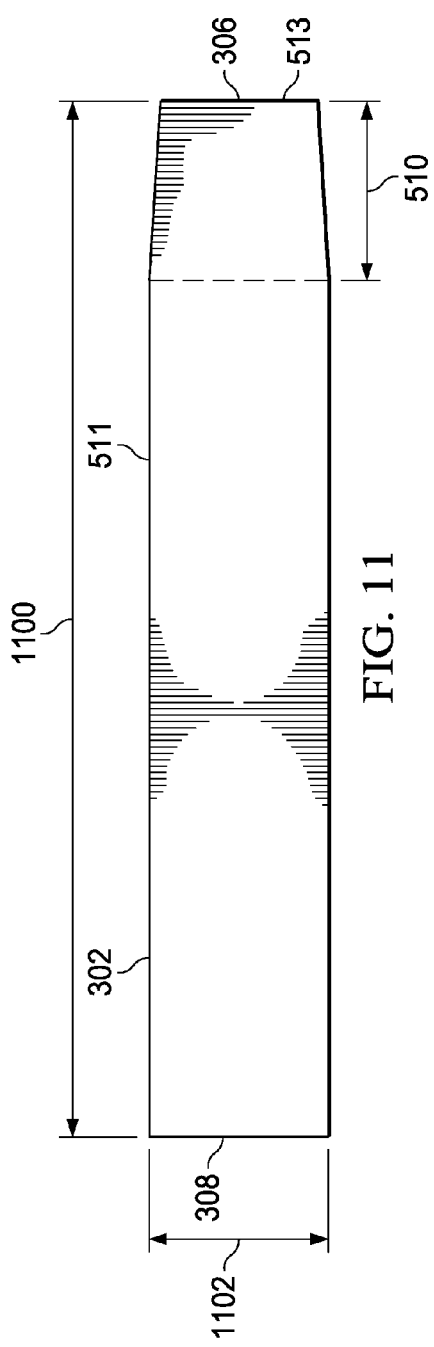
FIG. 11 is an illustration of a side view of a bladder in accordance with an illustrative embodiment.

With reference now to FIG. 11, an illustration of a side view of bladder 302 from FIG. 6 is depicted in accordance with an illustrative embodiment. In this depicted example, a side view of bladder 302 with respect to lines 11-11 in FIG. 6 is shown. In this particular example, bladder 302 may have length 1100 and height 1102. Length 1100 may be about 50 inches, and height 1102 may be about 3 inches.

Figure 12:
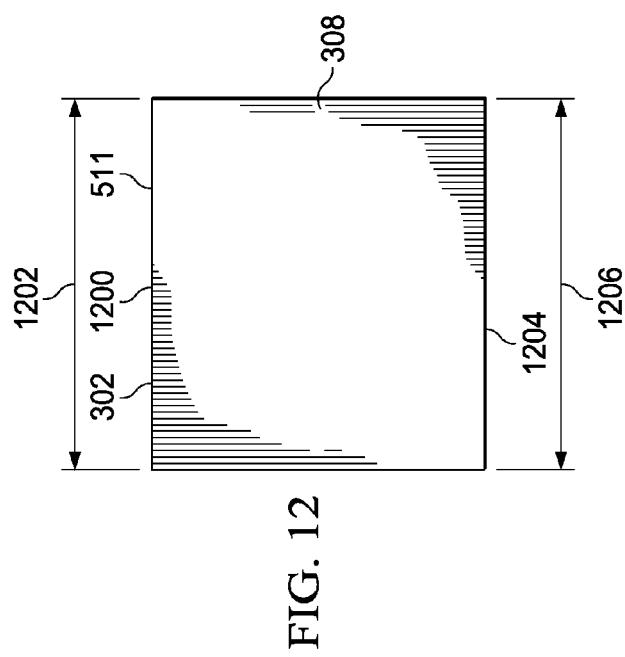
FIG. 12 is an illustration of an end view of a bladder in accordance with an illustrative embodiment.

In FIG. 12, an illustration of an end view of second end 308 of bladder 302 from FIG. 6 is depicted in accordance with an illustrative embodiment. As depicted, a view of second end 308 of bladder 302 is shown in this figure with respect to lines 12-12 in FIG. 6.

Second end 308 may be closed in this illustrative example. In this view, side 1200 may have width 1202, and side 1204 may have width 1206. Width 1202 may be about 3 inches, and width 1206 may be about 3 inches.

Figure 13:
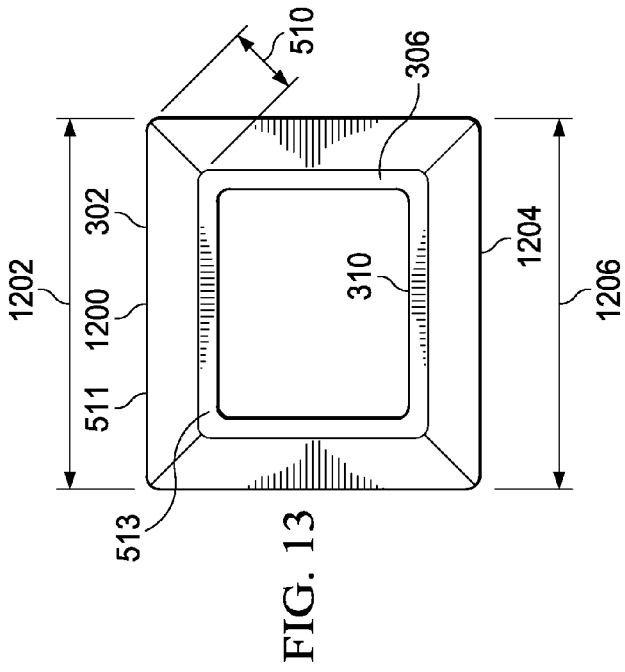
FIG. 13 is another illustration of an end view of a bladder in accordance with an illustrative embodiment.

With reference next to FIG. 13, another illustration of an end view of first end 306 of bladder 302 from FIG. 6 is depicted in accordance with an illustrative embodiment. In this figure, a view of first end 306 of bladder 302 is shown with respect to lines 13-13 in FIG. 6. Further, tapered portion 510 of bladder 302 is shown in this view of bladder 302.

Figure 14:
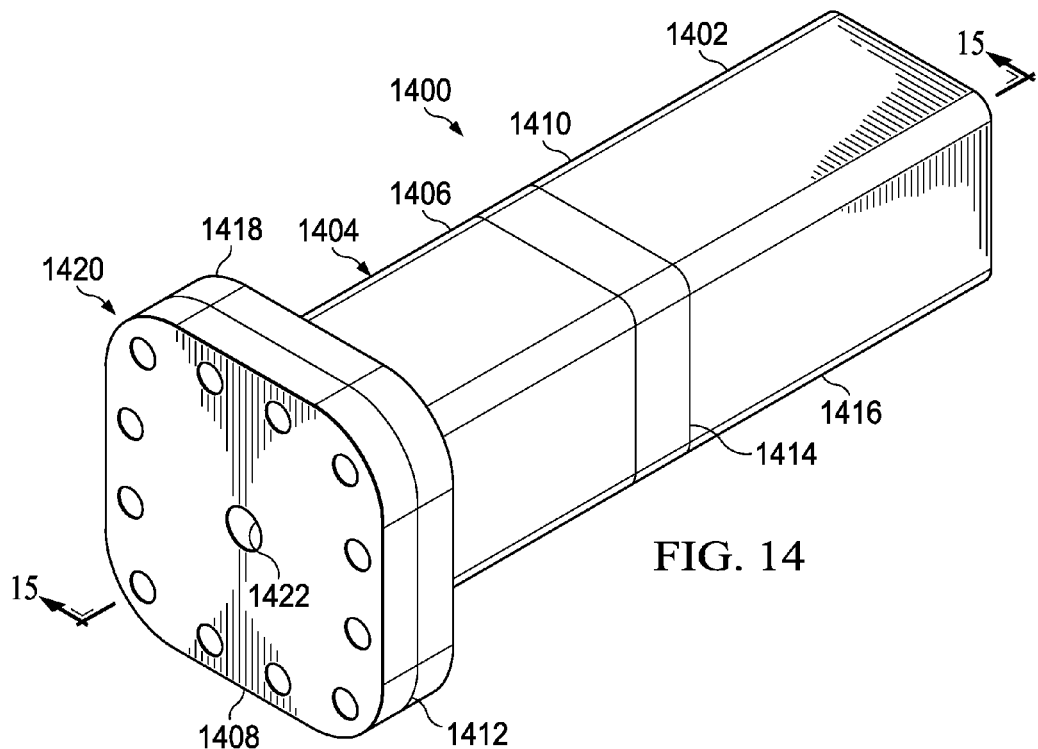
FIG. 14 is another illustration of a bladder system in accordance with an illustrative embodiment.

Turning now to FIG. 14, another illustration of a bladder system is depicted in accordance with an illustrative embodiment. As depicted, bladder system 1400 is an example of another physical implementation for bladder system 108 shown in block form in FIG. 1 and FIG. 2. In this depicted example, bladder system 1400 includes bladder 1402 and fitting 1404.

In this view, fitting 1404 includes structure 1406 and cap 1408. Structure 1406 has first end 1410 and second end 1412. First end 1414 of bladder 1402 may be open end 1416 and may be placed into and connected to the interior (not shown) of structure 1406 of fitting 1404.

In this example, second end 1412 of structure 1406 has flange 1418. Flange 1418 is configured to be connected to cap 1408. In these illustrative examples, this connection between flange 1418 and cap 1408 may be made using fasteners 1420. Further, cap 1408 also may include opening 1422. Opening 1422 may be used to pressurize bladder 1402.

Figure 15:
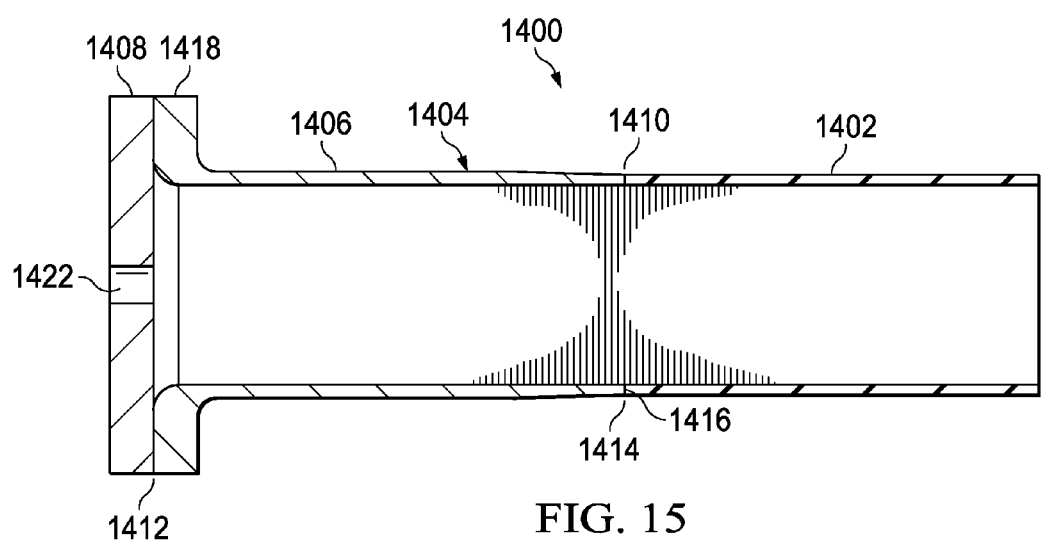
FIG. 15 is an illustration of a cross-sectional view of a fitting in accordance with an illustrative embodiment.

Turning now to FIG. 15, an illustration of a cross-sectional view of fitting 1404 from FIG. 14 is depicted in accordance with an illustrative embodiment. A cross-sectional view of fitting 1404 is shown taken along lines 15-15 in FIG. 14.

Figure 16:
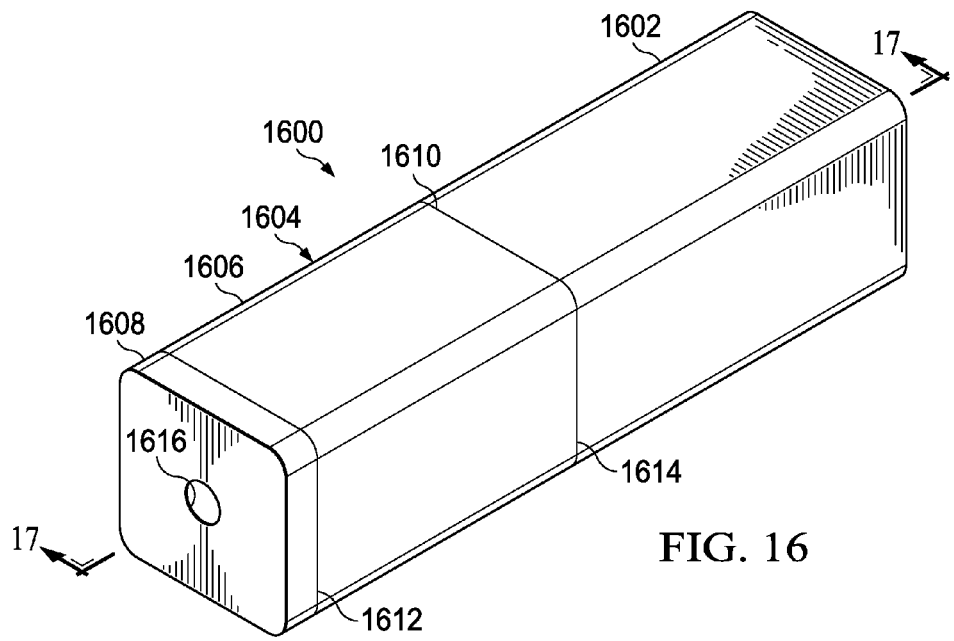
FIG. 16 is yet another illustration of a bladder system in accordance with an illustrative embodiment.

In FIG. 16, yet another illustration of a bladder system is depicted in accordance with an illustrative embodiment. As depicted, bladder system 1600 is another example of an implementation for bladder system 108 shown in block form in FIG. 1 and FIG. 2.

In this particular example, bladder system 1600 may comprise bladder 1602 and fitting 1604. Fitting 1604 may include structure 1606 and cap 1608. Structure 1606 of fitting 1604 may have first end 1610 and second end 1612. First end 1610 of structure 1606 may be configured to receive first end 1614 of bladder 1602.

Second end 1612 of structure 1606 may be configured to be connected to cap 1608. Cap 1608 may be connected to second end 1612 of structure 1606 using a weld, adhesive, or some other suitable mechanism.

As depicted, cap 1608 may have opening 1616. Bladder 1602 may be pressurized through opening 1616 in cap 1608.

Figure 17:
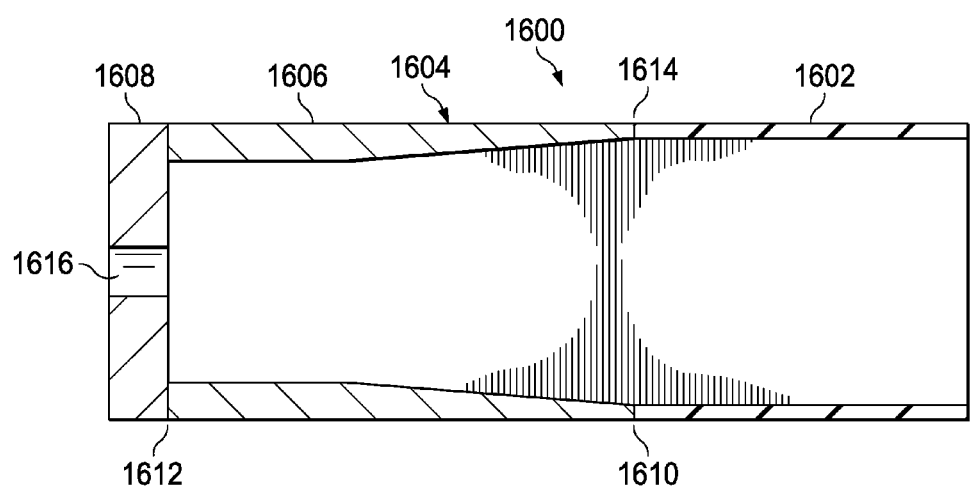
FIG. 17 is an illustration of a cross-sectional view of a fitting in accordance with an illustrative embodiment.

With reference now to FIG. 17, an illustration of a cross-sectional view of a fitting is depicted in accordance with an illustrative embodiment. In this view, a cross-sectional view of fitting 1604 is shown taken along lines 17-17 in FIG. 16.

The illustrations of bladder system 300 in FIGS. 3-13, bladder system 1400 in FIG. 14 and FIG. 15, and bladder system 1600 in FIG. 16 and FIG. 17 are only provided as examples of some physical implementations for bladder system 108 shown in block form in FIG. 1. These illustrations are not meant to limit the manner in which other bladder systems may be implemented. For example, without limitation, in other illustrative examples, fitting 304 in bladder system 300 may include a cap or plug (not shown). Further, other bladder systems may have other cross-sectional shapes other than the rectangle shape illustrated in these examples. For example, without limitation, other bladder systems may have a cross-sectional shape in the form of a circle, an oval, a hexagon, or some other suitable shape.

FIGS. 18-22 illustrate the formation of a bladder system in accordance with an illustrative embodiment. FIGS. 18-22 only illustrate some of the operations performed to form a bladder system such as bladder system 108 in FIG. 1. Some steps in the formation of bladder system 108 have been omitted to avoid obscuring the description of the illustrative embodiment.

Figure 18:
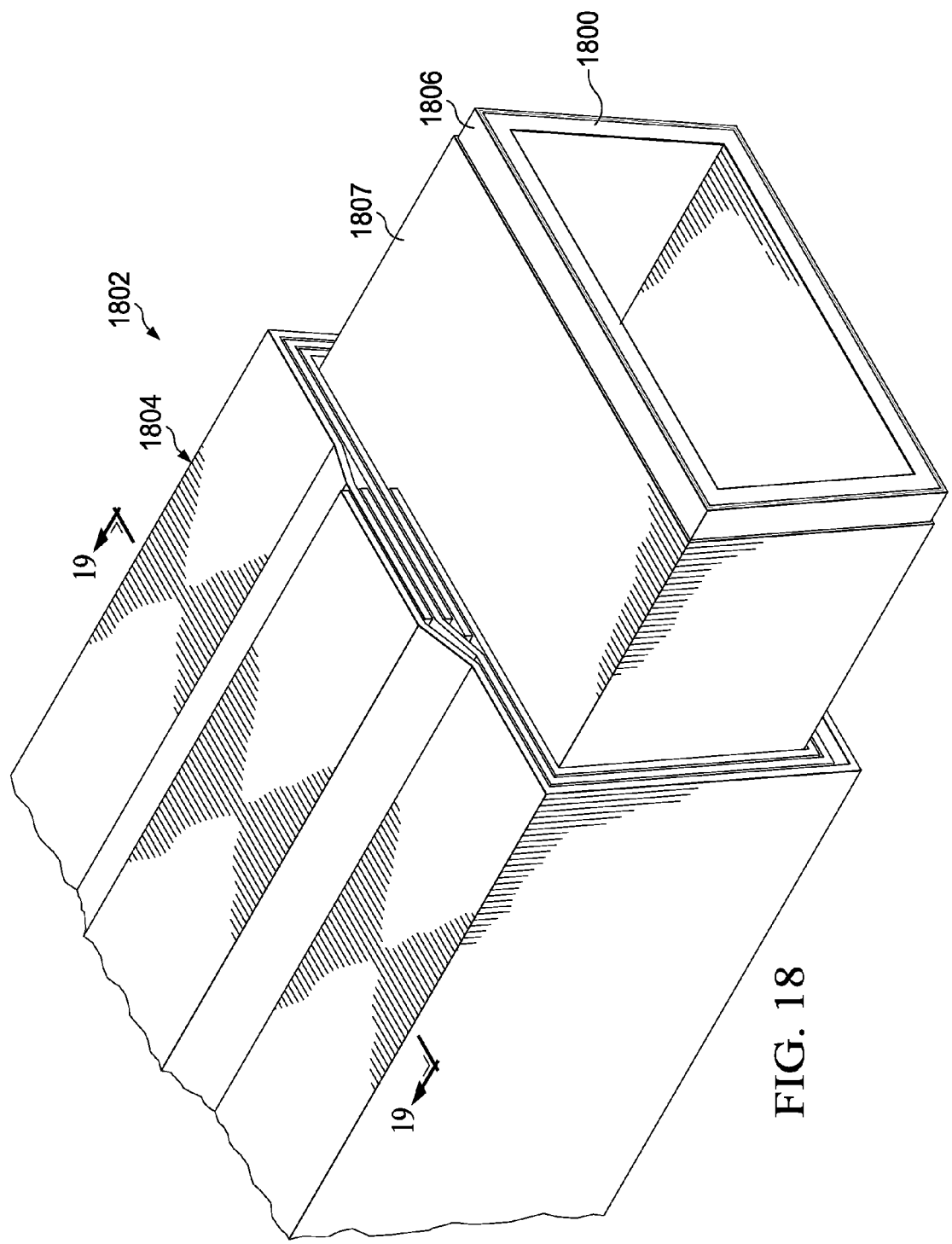
FIG. 18 is an illustration of a tool with layers of uncured material for a bladder system in accordance with an illustrative embodiment.

With reference first to FIG. 18, an illustration of a tool with layers of uncured material for a bladder system is depicted in accordance with an illustrative embodiment. In this isometric view, first tool 1800 in tool system 1802 is shown with layers of uncured material 1804 wrapped around first tool 1800. Uncured material 1804 may be the material used to form a bladder for the bladder system.

First tool 1800 may be comprised of a number of different types of materials. For example, first tool 1800 may be comprised of a number of materials selected from at least one of a plastic, a foam, a rubber, a metal, and other suitable materials.

As depicted, first tool 1800 may be located within a layer of low friction material 1806. Low friction material 1806 may facilitate easier removal of first tool 1800 from layers of uncured material 1804. A low friction material may be any material having a coefficient of friction that allows for removal of first tool 1800 from layers of uncured material 1804. This removal may occur after layers of uncured material 1804 are cured. Additionally, tube of bagging material 1807 may be placed between layers of uncured material 1804 and layer of low friction material 1806. Low friction material 1806 may be comprised of a number of materials selected from at least one of a plastic, a polytetrafluoroethylene, a nylon, a natural fiber, and other suitable materials.

In the illustrative example, tube of bagging material 1807 may be used to apply outward pressure on layers of uncured material 1804 during curing of layers of uncured material 1804. The inflation of tube of bagging material 1807 may occur as a vacuum is drawn from outside of tube of bagging material 1807. In this manner, tube of bagging material 1807 may apply an outward pressure to layers of uncured material 1804 to assist in the bonding of layers of uncured material 1804. Tube of bagging material 1807 may be comprised of a number of materials selected from at least one of a plastic, a nylon, a silicone, an elastomer, and other suitable materials.

Figure 19:
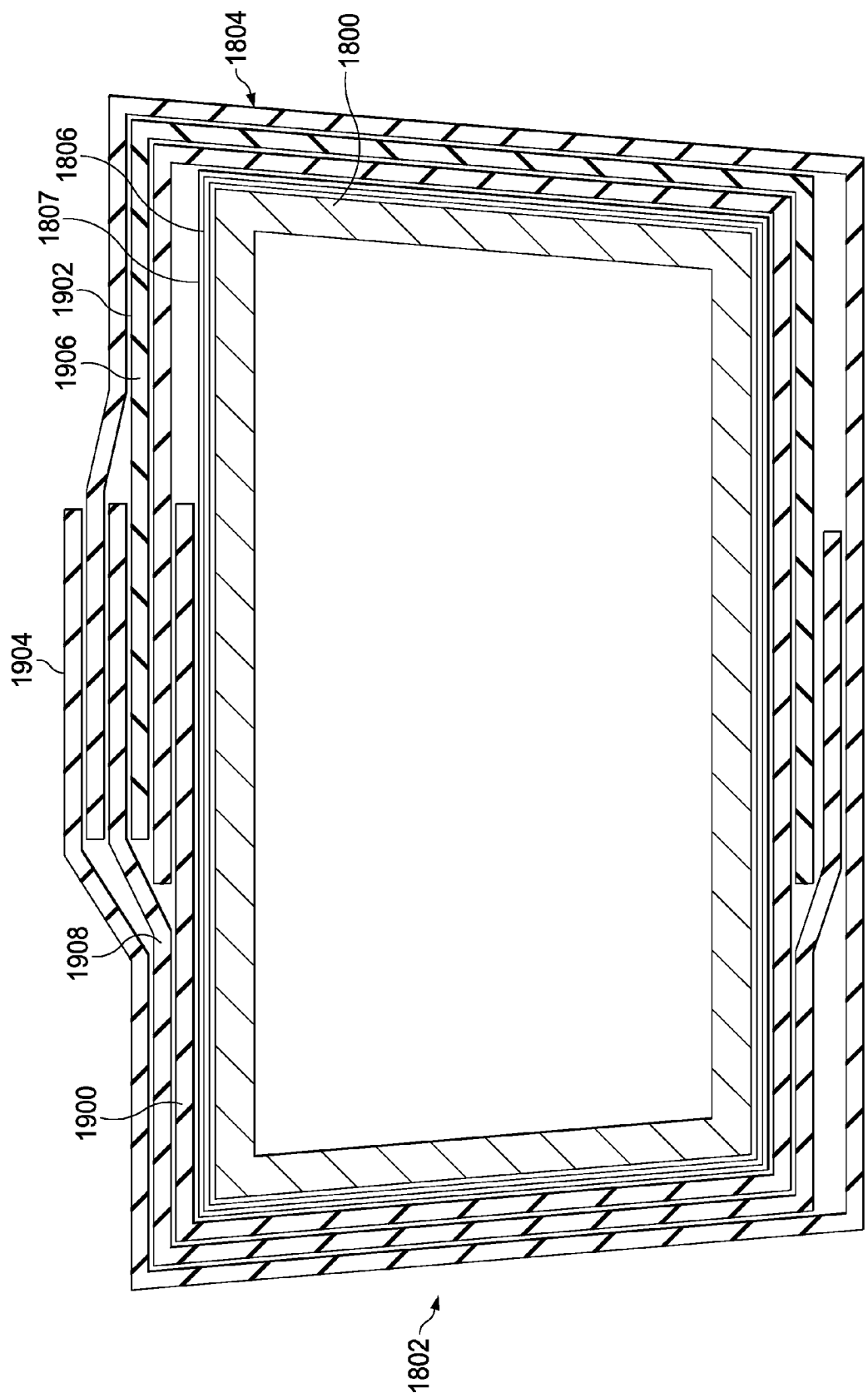
FIG. 19 is an illustration of a cross-sectional view of layers of uncured material laid up in a tool system in accordance with an illustrative embodiment.

Turning now to FIG. 19, an illustration of a cross-sectional view of layers of uncured material laid up in a tool system is depicted in accordance with an illustrative embodiment. In this particular example, a cross-sectional view of first tool 1800 in tool system 1802 with layers of uncured material 1804 is shown taken along lines 19-19 in FIG. 18.

In this depicted example, layers of uncured material 1804 may include first rubber layer 1900, fiberglass coated rubber layer 1902, and second rubber layer 1904. As shown in this example, fiberglass coated rubber layer 1902 may be comprised of first portion 1906 and second portion 1908.

Of course, in other illustrative examples, other numbers of layers and other types of materials may be used within the layers. For example, without limitation, in some illustrative examples, layers of uncured material 1804 may include two layers, seven layers, or some other suitable number of layers depending on the particular implementation. Other examples of layers that may be used include, for example, without limitation, rubber, plain fiberglass, a third layer of rubber, rubber and plain fiberglass, rubber and coated fiberglass, rubber alone, rubber coated with a durable non-bondable film, and types of single layers or combinations of layers.

Figure 20:
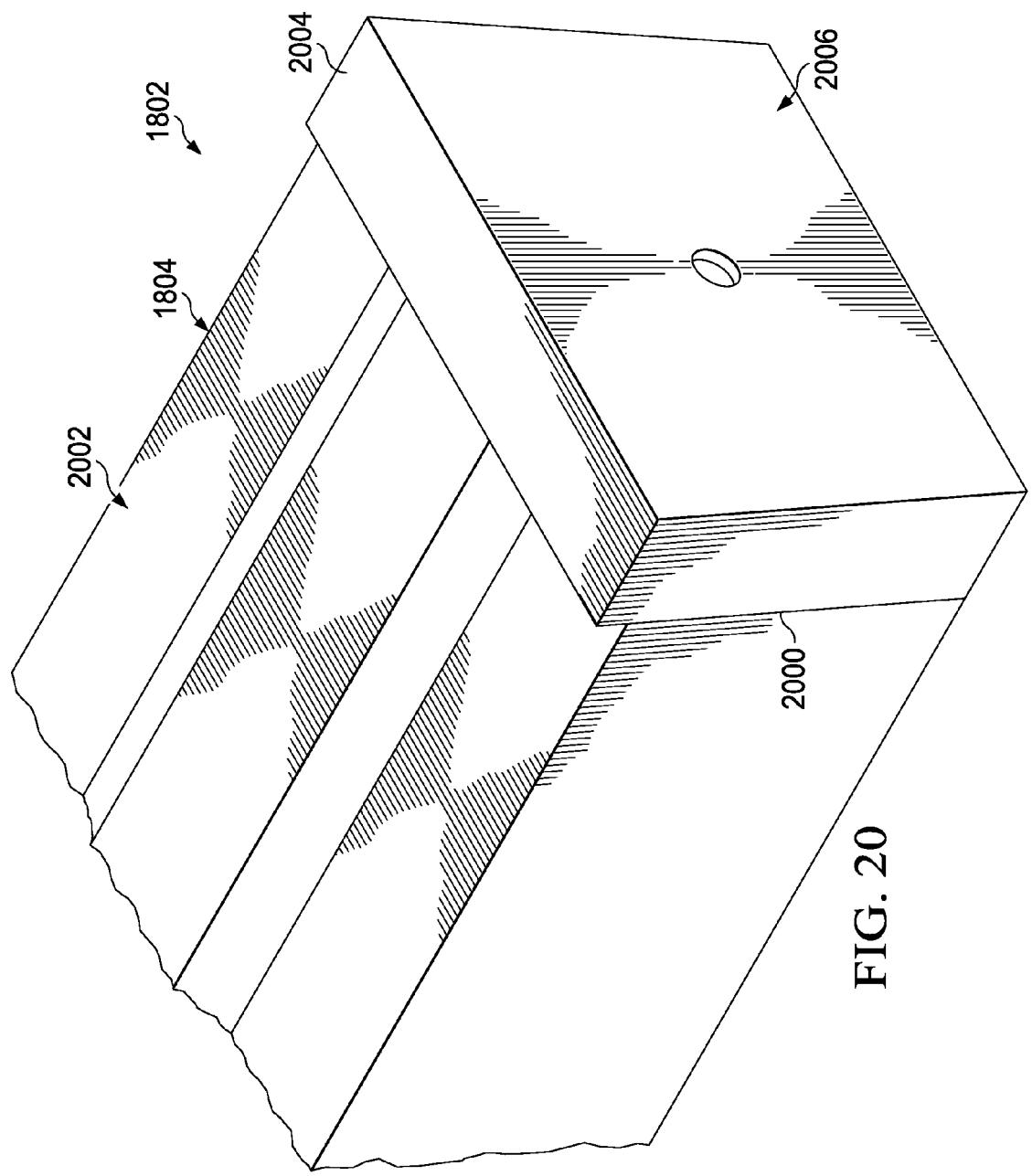
FIG. 20 is an illustration of layers of uncured material in a fitting in accordance with an illustrative embodiment.

Turning now to FIG. 20, an illustration of layers of uncured material in a fitting is depicted in accordance with an illustrative embodiment. In this illustration, layers of uncured material 1804 may take the form of uncured bladder 2002. When cured, layers of uncured material 1804 may form a bladder (not shown), such as bladder 302 in FIG. 3. End 2000 of uncured bladder 2002 is shown inserted into the interior (not shown in this view) of fitting 2004. Uncured bladder 2002 with fitting 2004 may together form bladder system 2006.

Figure 21:
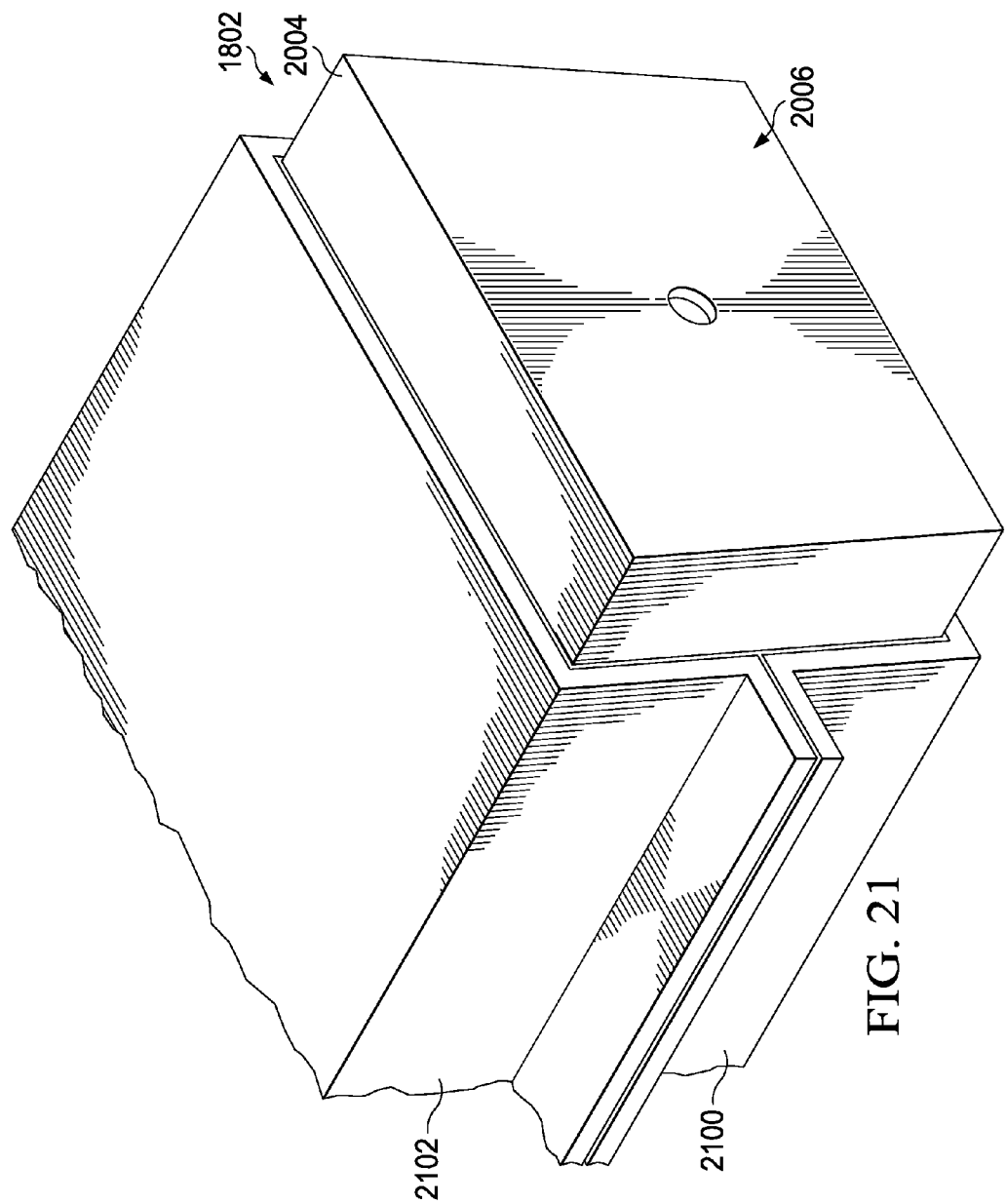
FIG. 21 is an illustration of layers of uncured material in a fitting placed into tools in a tool system in accordance with an illustrative embodiment.

With reference next to FIG. 21, an illustration of layers of uncured material in a fitting placed into tools in a tool system is depicted in accordance with an illustrative embodiment. As can be seen in this particular example, layers of uncured material 1804 (not shown in this view) may be placed on second tool 2100 and covered by third tool 2102. Second tool 2100 and third tool 2102 may be secured to each other. In these illustrative examples, second tool 2100 and third tool 2102 may be comprised of a number of materials selected from at least one of aluminum, steel, and other suitable types of materials.

Figure 22:
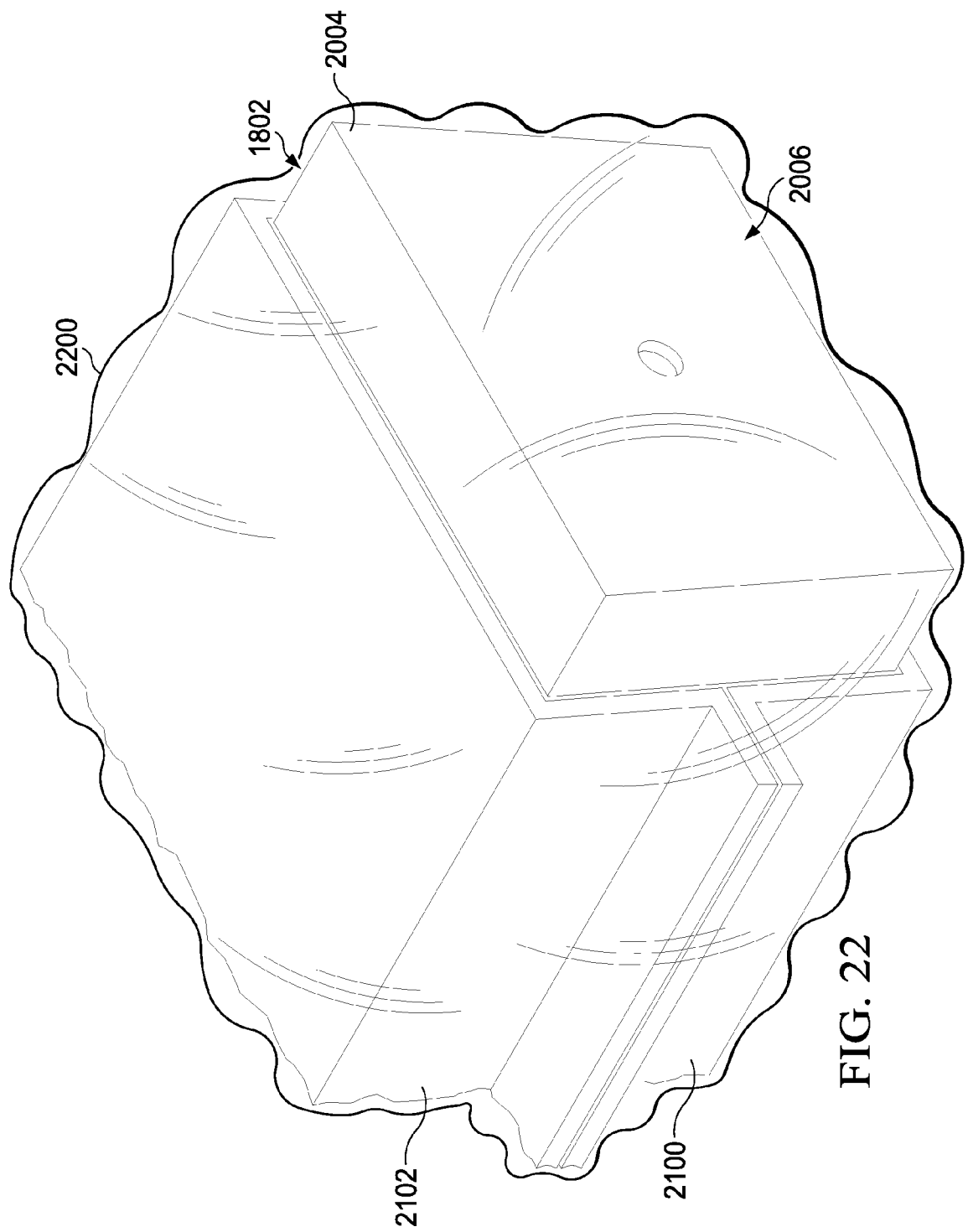
FIG. 22 is an illustration of a tool system with layers of uncured material in a fitting prepared for curing in accordance with an illustrative embodiment.

In FIG. 22, an illustration of a tool system with layers of uncured material in a fitting prepared for curing is depicted in accordance with an illustrative embodiment. In this view, vacuum bag 2200 may cover layers of uncured material 1804 (not shown) laid up on tool system 1802 with fitting 2004. With vacuum bag 2200, a vacuum may be drawn and pressure may be placed on layers of uncured material 1804 during curing of layers of uncured material 1804 with fitting 2004 in tool system 1802.

Layers of uncured material 1804, which form uncured bladder 2002 (not shown), may be cured to form a cured bladder (not shown). In this manner, bladder system 2006 may now include both the cured bladder and fitting 2004. Bladder system 2006 may be used to form different types of composite structures.

The illustrations of the different operations in FIGS. 18-22 are not meant to limit the manner in which an illustrative embodiment may be implemented to manufacture a bladder system. For example, without limitation, layers of uncured material 1804 may be wrapped around second tool 2100 instead of being placed onto first tool 1800.

The different components shown in FIGS. 3-22 may be combined with components in FIG. 2 and FIG. 3, used with components in FIG. 1 and FIG. 2, or a combination of the two. Additionally, some of the components in FIGS. 3-22 may be illustrative examples of how components shown in block form in FIG. 1 and FIG. 2 can be implemented as physical structures.

Figure 23:
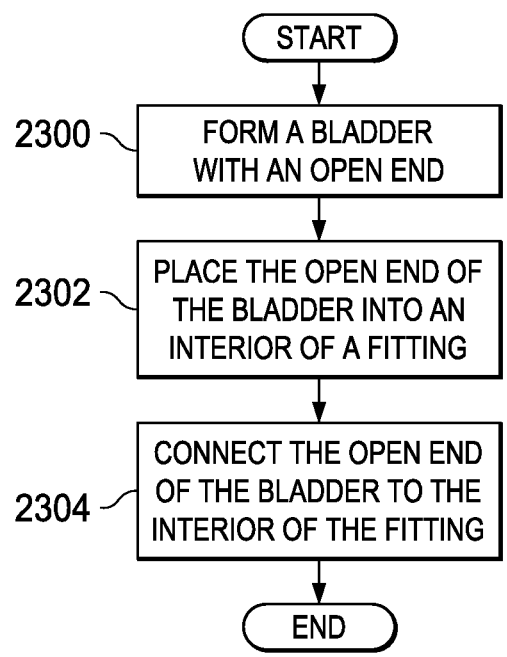
FIG. 23 is an illustration of a flowchart of a process for forming a bladder system in accordance with an illustrative embodiment.

With reference now to FIG. 23, an illustration of a flowchart of a process for forming a bladder system is depicted in accordance with an illustrative embodiment. In this depicted example, bladder system 300 in FIG. 3 may be formed in bladder system manufacturing environment 200 in FIG. 2 using the different operations illustrated in FIG. 23.

The process may begin by forming bladder 110 with open end 122 (operation 2300). Next, open end 122 of bladder 110 may be placed into interior 127 of fitting 112 (operation 2302). Open end 122 of bladder 110 may then be connected to interior 127 of fitting 112 (operation 2304), with the process terminating thereafter.

Connecting open end 122 of bladder 110 to interior 127 of fitting 112 may be performed in a number of different ways. For example, without limitation, bladder 110 may be cured with open end 122 located within interior 127 of fitting 112. In other illustrative examples, adhesive 202 in FIG. 2 also may be used.

In this manner, a bond may be formed between open end 122 of bladder 110 and interior 127 of fitting 112. This bonding may be, for example, without limitation, at least one of a chemical bond, an adhesive bond, a covalent bond, a physical bond, and other suitable types of bonds. For example, the bond may be a chemical bond that results from curing open end 122 of bladder 110 and interior 127 of fitting 112. In another illustrative example, an adhesive bond may be formed when adhesive 202 is used between open end 122 of bladder 110 and interior 127 of fitting 112.

Figure 24:
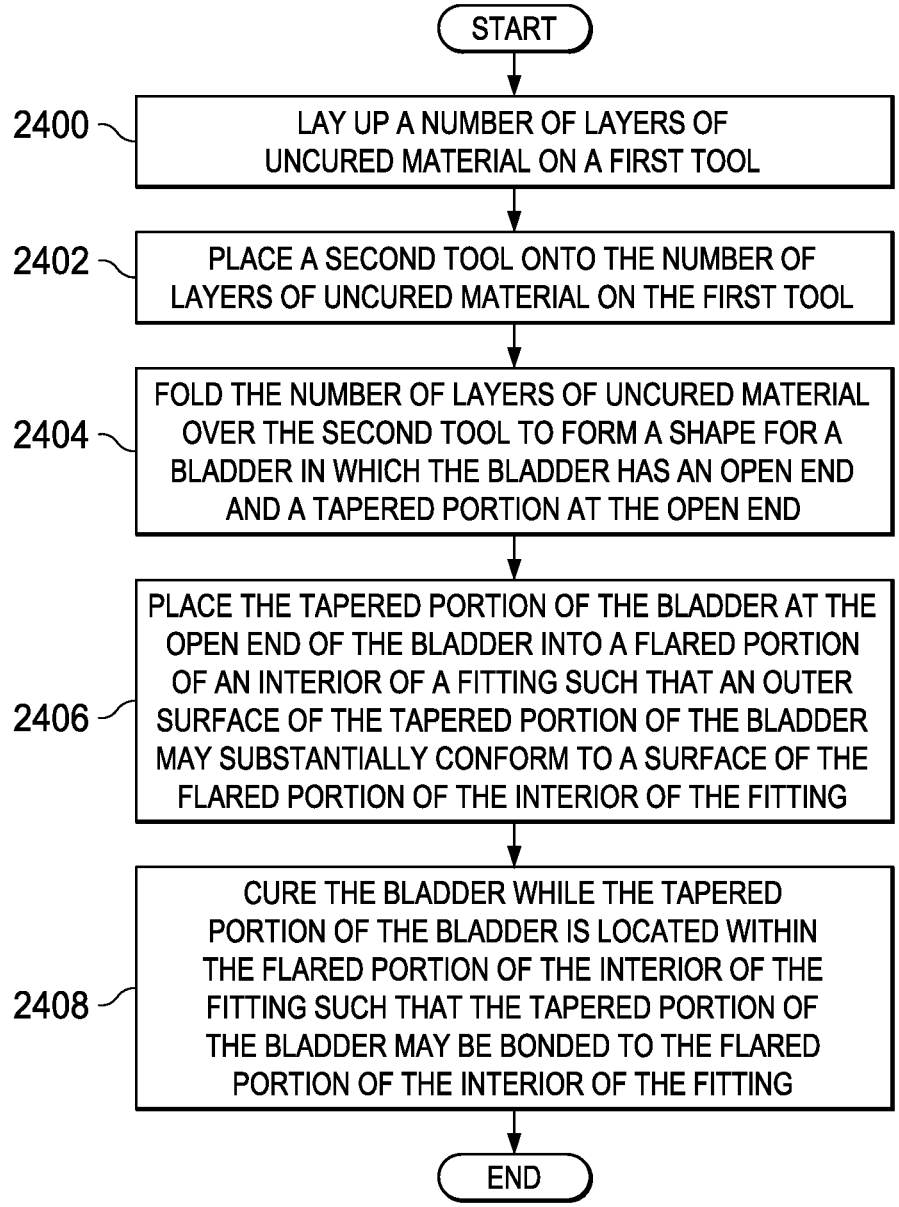
FIG. 24 is an illustration of a process for forming a bladder system is depicted in the form of a flowchart in accordance with an illustrative embodiment.

With reference now to FIG. 24, an illustration of a process for forming a bladder system is depicted in the form of a flowchart in accordance with an illustrative embodiment. The process illustrated in FIG. 24 may be used to form bladder system 108 described in FIG. 1.

The process may begin by laying up number of layers of uncured material 204 on first tool 206 (operation 2400) Next, the process may place second tool 210 onto number of layers of uncured material 204 on first tool 206 (operation 2402). Number of layers of uncured material 204 may then be folded over second tool 210 to form shape 212 for bladder 110 in which bladder 110 has open end 122 and tapered portion 126 at open end 122 (operation 2404).

Operations 2400, 2402, and 2404 may be performed to form bladder 110 in the form of uncured bladder 214. In particular, once number of layers of uncured material 204 has been shaped into shape 212 for bladder 110, number of layers of uncured material 204 may form uncured bladder 214.

Thereafter, tapered portion 126 of bladder 110 at open end 122 of bladder 110 may be placed into flared portion 151 of interior 127 of fitting 112 such that an outer surface of tapered portion 151 of bladder 110 may substantially conform to surface 155 of flared portion 151 of interior 127 of fitting 112 (operation 2406). In particular, in operation 2406, tapered portion 126 of bladder 110 may be inserted into interior 127 of fitting 112 through open end 132 of fitting 112.

Then, bladder 110 may be cured while tapered portion 126 of bladder 110 is located within flared portion 151 of interior 127 of fitting 112 such that tapered portion 126 of bladder 110 may be bonded to flared portion 151 of interior 127 of fitting 112 (operation 2408), with the process terminating thereafter. After operation 2408 has been performed, bladder 110 takes the form of cured bladder 219. Bladder 110 and fitting 112 may together form bladder system 108.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, without limitation, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Illustrative embodiments of the disclosure may be described in the context of aircraft manufacturing and service method 2500 as shown in FIG. 25 and aircraft 2600 as shown in FIG. 26. Turning first to FIG. 25, an illustration of an aircraft manufacturing and service method is depicted in accordance with an illustrative embodiment. During pre-production, aircraft manufacturing and service method 2500 may include specification and design 2502 of aircraft 2600 in FIG. 26 and material procurement 2504.

During production, component and subassembly manufacturing 2506 and system integration 2508 of aircraft 2600 in FIG. 26 takes place. Thereafter, aircraft 2600 in FIG. 26 may go through certification and delivery 2510 in order to be placed in service 2512. While in service 2512 by a customer, aircraft 2600 in FIG. 26 is scheduled for routine maintenance and service 2514, which may include modification, reconfiguration, refurbishment, and other maintenance or service.

Each of the processes of aircraft manufacturing and service method 2500 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 26, an illustration of an aircraft is depicted in which an illustrative embodiment may be implemented. In this example, aircraft 2600 is produced by aircraft manufacturing and service method 2500 in FIG. 25 and may include airframe 2602 with plurality of systems 2604 and interior 2606. Examples of systems 2604 include one or more of propulsion system 2608, electrical system 2610, hydraulic system 2612, and environmental system 2614. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2500 in FIG. 25. In one illustrative example, components or subassemblies with composite structures may be manufactured using bladder system 108. For example, without limitation, bladder system 108 may be used to aid in the formation of channels, cavities, and other volumes within a composite structure. Further, in one or more illustrative embodiments, bladder system 108 may be manufactured for use in forming composite structures during component and subassembly manufacturing 2506 in FIG. 25 may be fabricated or manufactured in a manner similar to components or subassemblies produced while aircraft 2600 is in service 2512 in FIG. 25.

One or more apparatus embodiments, method embodiments, or a combination thereof may be utilized while aircraft 2600 is in service 2512 and/or during maintenance and service 2514 in FIG. 25. For example, without limitation, one or more illustrative embodiments may be used to form composite structures, manufacture bladder system 108, or some combination thereof during maintenance and service 2514. For example, without limitation, composite structures may be manufactured using an illustrative embodiment during refurbishment, repair, upgrade, and other operations that may be performed during maintenance and service 2514. The use of a number of the different illustrative embodiments may substantially expedite the assembly of and/or reduce the cost of aircraft 2600.

Thus, one or more of the illustrative embodiments may be used to fabricate composite structures such as composite structure 102 in FIG. 1. For example, without limitation, with the use of bladder system 108, a loss of pressure within bladder system 108 may be reduced during the manufacturing of composite structure 102. In this manner, rework, replacement, and both rework and replacement of composite structure 102 may be reduced or avoided.

In these illustrative examples, bladder system 108 may be used to form channel 107 in layers of composite material 104 for composite structure 102. Bladder system 108 may be pressurized, sealed, or may be both pressurized and sealed while layers of composite material 104 are cured to form composite structure 102 in a cured form.

The configuration of at least one of bladder 110 and fitting 112 and their association with each other may be such that these two components are less likely to separate or develop leaks during the curing of layers of composite material 104 to form composite structure 102. In one illustrative example, layers of material in an uncured form, such as number of layers of uncured material 204 in FIG. 2, may be cured directly to fitting 112. With tapered portion 126 of bladder 110 located within interior 127 of fitting 112, bond line 156 between bladder 110 and fitting 112 is also located within interior 127 of fitting 112. As a result, the pressure on bond line 156 may be reduced.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the practical application, and to enable others of ordinary skill in the art to understand the disclosure for various embodiments with various modifications as are suited to the particular use contemplated.

What is claimed is:

1. A method for forming a bladder system, the method comprising:
   forming a bladder with an open end, such that a portion of the bladder at the open end of the bladder has a cross-section with an outer cross-sectional shape that decreases in size towards the open end of the bladder comprising:
      laying up a number of layers of uncured material into a shape for the bladder; and
      curing the number of layers of uncured material with the open end of the bladder located within an interior of a fitting;
   placing the open end of the bladder into the interior of the fitting such that the open end of the bladder extends to an end of the fitting; and
   bonding the bladder with the open end located within the interior of the fitting to the interior of the fitting so that an outer surface of the open end of the bladder is bonded to an interior surface of the fitting.

2. The method of claim 1, wherein bonding the open end of the bladder to the interior of the fitting comprises:
bonding the open end of the bladder to the interior of the fitting with an adhesive or by curing the bladder with the open end located within the interior of the fitting.

3. The method of claim 1, wherein placing the open end of the bladder into the interior of the fitting comprises:
placing the open end of the bladder into the interior of the fitting through an open end of the fitting, wherein a portion of the fitting at the open end of the fitting has a cross-section with an inner cross-sectional shape defined by a surface of the interior of the fitting in which the inner cross-sectional shape increases towards the open end of the fitting.

4. The method of claim 1, wherein forming the bladder with the open end comprises:
forming the bladder such that a portion of the bladder at the open end of the bladder is a tapered portion.

5. The method of claim 4, wherein placing the open end of the bladder into the interior of the fitting comprises:
placing the tapered portion of the bladder at the open end of the bladder into a flared portion of the interior of the fitting such that an outer surface of the tapered portion of the bladder substantially conforms to a surface of the flared portion of the interior of the fitting.

6. The method of claim 1, wherein laying up the number of layers of uncured material into the shape for the bladder comprises:
laying up the number of layers of uncured material on a first tool;
placing a second tool onto the number of layers of uncured material on the first tool; and
folding the number of layers of uncured material over the second tool to form the shape for the bladder.

7. The method of claim 1, wherein the number of layers of uncured material comprises at least one of a layer of rubber, a layer of fiberglass coated rubber, a layer of fiberglass-reinforced rubber, a layer of a carbon fiber-reinforced polymer, and a layer of fiber-reinforced silicon.

8. A method for forming a bladder system, the method comprising:
forming a bladder with an open end;
placing the open end of the bladder into an interior of a fitting such that the open end of the bladder extends to an end of the fitting;
wherein the bladder is an elastomeric bladder configured to deform such that a portion of the bladder at the open end of the bladder substantially conforms to the interior of the fitting when placed into the interior of the fitting; and
bonding the bladder with the open end located within the interior of the fitting to the interior of the fitting so that an outer surface of the open end of the bladder is bonded to an interior surface of the fitting.

9. A method for forming a bladder system, the method comprising:
forming an elastomeric bladder having an open end such that a portion of the elastomeric bladder at the open end of the elastomeric bladder is a tapered portion having a cross-section with an outer cross-sectional shape that decreases in size towards the open end of the elastomeric bladder;
placing the tapered portion of the elastomeric bladder into a flared portion of an interior of a fitting through an open end of the fitting such that an outer surface of the tapered portion substantially conforms to a surface of the flared portion in which a portion of the fitting at the open end of the fitting has a cross-section with an inner cross-sectional shape defined by the surface of the flared portion in which the inner cross-sectional shape increases towards the open end of the fitting, and such that the open end of the elastomeric bladder extends to an end of the fitting; and
bonding the open end of the elastomeric bladder to the interior of the fitting by bonding the elastomeric bladder to the interior of the fitting with the tapered portion located within the interior of the fitting so that an outer surface of the open end of the bladder is bonded to an interior surface of the fitting.

10. An apparatus comprising:
a bladder with an open end, wherein the bladder comprises a tapered portion at the open end of the bladder, wherein the tapered portion has a cross-section with an outer cross-sectional shape that decreases in size towards the open end of the bladder; and
a fitting in which the open end of the bladder is bonded to a surface of an interior of the fitting, wherein the open end of the bladder extends to an end of the fitting, wherein the open end of the bladder is bonded to the surface of the interior of the fitting by a bond formed by curing the open end of the bladder located within the interior of the fitting.

11. The apparatus of claim 10, wherein the interior of the fitting comprises:
a flared portion, wherein a portion of the fitting at an open end of the fitting has a cross-section with an inner cross-sectional shape formed by a surface of the flared portion in which the inner cross-sectional shape increases in size towards the open end of the fitting.

12. An apparatus comprising:
a bladder with an open end, wherein the bladder comprises a tapered portion at the open end of the bladder, wherein the tapered portion has a cross-section with an outer cross-sectional shape that decreases in size towards the open end of the bladder, and, wherein the bladder is comprised of at least one of a layer of rubber, a layer of fiberglass coated rubber, a layer of fiberglass-reinforced rubber, a layer of a carbon fiber-reinforced polymer, and a layer of fiber-reinforced silicon; and
a fitting in which the open end of the bladder is bonded to a surface of an interior of the fitting, wherein the open end of the bladder extends to an end of the fitting.

13. An apparatus comprising:
a bladder with an open end, wherein the bladder is an elastomeric bladder; and
a fitting in which the open end of the bladder is bonded to a surface of an interior of the fitting, wherein the open end of the bladder extends to an end of the fitting.

14. The apparatus of claim 10, wherein the fitting is comprised of a material selected from one of metal, polycarbonate, plastic, aluminum, steel, and a composite material.

15. A bladder system for forming a composite structure with a channel, the bladder system comprising:
an elastomeric bladder having an open end in which a tapered portion of the elastomeric bladder at the open end of the elastomeric bladder has a cross-section with an outer cross-sectional shape that decreases in size towards the open end of the elastomeric bladder;
a fitting having an interior with a flared portion at an open end of the fitting in which a portion of the fitting at the open end of the fitting has a cross-section with an inner cross-sectional shape formed by a surface of the flared portion that increases in size towards the open end of the fitting; in which the open end of the elastomeric bladder is connected to the interior of the fitting by being bonded to the surface of the flared portion of the interior of the fitting; and in which the fitting is comprised of a material selected from one of metal, polycarbonate, plastic, aluminum, steel, and a composite material; and
wherein the open end of the bladder extends to an end of the fitting.

\* \* \* \* \*